(12) United States Patent
Kumar et al.

(10) Patent No.: US 8,806,410 B2
(45) Date of Patent: Aug. 12, 2014

(54) POWER BALANCED PIPELINES

(71) Applicant: The Board of Trustees of the University of Illinois, Urbana, IL (US)

(72) Inventors: Rakesh Kumar, Champaign, IL (US); Benjamin J. Ahrens, Champaign, IL (US); John M. Sartori, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 13/662,929

(22) Filed: Oct. 29, 2012

(65) Prior Publication Data
US 2013/0111425 A1 May 2, 2013

Related U.S. Application Data

(60) Provisional application No. 61/552,703, filed on Oct. 28, 2011.

(51) Int. Cl.
*G06F 17/50* (2006.01)
(52) U.S. Cl.
CPC .......... *G06F 17/505* (2013.01); *G06F 2217/84* (2013.01); *G06F 2217/78* (2013.01); *G06F 2217/14* (2013.01); *G06F 17/5022* (2013.01)
USPC ............................ 716/133; 716/109; 716/120
(58) Field of Classification Search
CPC . G06F 9/3873; G06F 9/3079; G06F 2217/78; G06G 2217/84
USPC .......................................... 716/109, 120, 133
See application file for complete search history.

(56) References Cited

U.S. PATENT DOCUMENTS

| | | | | |
|---|---|---|---|---|
| 5,737,614 A | * | 4/1998 | Durham et al. | 713/322 |
| 6,834,353 B2 | * | 12/2004 | Smith et al. | 713/320 |
| 8,291,201 B2 | * | 10/2012 | Schwinn et al. | 712/229 |
| 2003/0120899 A1 | * | 6/2003 | Stotzer et al. | 712/214 |
| 2013/0187805 A1 | * | 7/2013 | Garrity | 341/155 |

OTHER PUBLICATIONS

Sartori et al.,"Power Balanced Pipelines", Feb. 2012, IEEE International Symposium on High Performance Computer Architecture, paper, pp. 1-12.*
Murphy et al.,"Power-balanced Asynchronous Logic", Aug. 2005, IEEE Proceedings of the 2005 Eurpoean Conference on Circuit Theory and Design, vol. 2, pp. II/213-II/216.*
Smirnov et al.,"Synthesizing Asynchronous Micropipes with Design Compiler", 2006 SNUG Boston, paper, one set (35 pages).*

(Continued)

*Primary Examiner* — Sun Lin
(74) *Attorney, Agent, or Firm* — Saliwanchik, Lloyd & Eisenschenk

(57) ABSTRACT

Power balancing techniques are provided for improving power efficiency of pipelined processors. A design-level implementation can be incorporated during synthesis of pipeline clocks in which a register transfer level (RTL) code, operating frequency, and available voltage domains are used to perform cycle time stealing with, and optimize for, power efficiency. A test-level implementation can be incorporated during testing of a chip in which delay and power measurements are used to perform calculations based on cycle time stealing and optimization of power efficiency. The calculations are then used to perform voltage scaling and/or adjust tunable delay buffers. Process variations may also be corrected during test time. A run-time approach can be incorporated for dynamic power balancing in which the operating system keeps track of one or more performance indicators such as a count of floating point instructions and uses a look-up table to provide the appropriate delays.

21 Claims, 19 Drawing Sheets

(56) References Cited

OTHER PUBLICATIONS

Venkataramani et al., Operation Chaining Asynchronous Pipelined Circuits, Nov. 2007, IEEE International Conference on Computer-Aided Design, paper, pp. 442-449.*

Lee et al.,"Reducing Pipeline Energy Demands woth Local DVS and Dynamic Retiming", Aug. 2004, IEEE Proceedings of the 2004 International Symposium on Low Power Electronics and Design, pp. 319-324.*

* cited by examiner

Delay Balanced

Power Balanced

| FP_OPS<=N | $V_1$ | $V_2$ | ... | $V_M$ |
|---|---|---|---|---|
| FP_OPS>N | $V_1$ | $V_2$ | ... | $V_M$ |

POWER BALANCED PIPELINES

BACKGROUND

Current processor architecture design involves "pipelining" in which instructions are broken into smaller steps referred to as "stages" and performed in a manner reminiscent of an assembly line. Generally, each stage is assigned a certain amount of time to be performed. This is also referred to as "delay". Pipelined processors are popular because once all the stages of the pipeline are filled (i.e. executing their assigned step), it only takes a length of one cycle (the delay of a stage) to complete an instruction. In this manner, the computer's cycle time is the time of the slowest stage in the pipeline.

It is generally understood that the throughput of a processor pipeline is maximized when the total latency of the pipeline is divided evenly between all the stages. Thus, balancing the delay of the microarchitectural pipeline stages such that each microarchitectural pipeline stage has an equal delay has been a primary design objective in order to maximize instruction throughput.

"Instruction throughput" refers to the number of instructions that can be executed in a unit of time. In particular, while a particular instruction may physically require a certain amount of time (or clock cycles) to be performed, once the pipeline is filled, each instruction can appear to be completed (or "retired") in a single unit of time or "cycle".

Although balancing delay across pipeline stages increases instruction throughput, a delay-balanced approach can cause significant energy inefficiency in processors because each microarchitectural pipeline stage gets the same amount of time to complete, irrespective of its size or complexity. For power-optimized processors (i.e., processors where circuit and design-level optimizations reclaim timing slack to save power), the inefficiency manifests itself as a significant imbalance in power consumption of different microarchitectural pipeline stages.

Accordingly, with escalating power density, a focus of ongoing research is being directed to energy efficiency.

BRIEF SUMMARY

Systems and techniques are provided for power balanced pipelines. Embodiments include static and dynamic approaches to power balancing at a microarchitectural level.

According to one aspect, different delays are assigned to different microarchitectural pipeline stages to reduce the power disparity between the stages.

According to another aspect, power efficiency is optimized through a power balancing technique that utilizes cycle time stealing to maximize frequency by donating time from fast microarchitectural stages to slow microarchitectural stages. Cycle time stealing is used to deliberately redistribute cycle time from low-power pipeline stages to power-hungry stages, relaxing their timing constraints and allowing them to operate at reduced voltages or use smaller, less leaky cells.

According to yet another aspect, cycle time stealing is deliberately constrained to be performed in a manner that promotes balance within a loop and takes the microarchitectural processing loops to which a stage belongs into consideration before adjusting the amount of delay taken from or given to a stage.

A static technique based on cycle time stealing is used for a design-level power balancing implementation that takes as input a register transfer level code of a microarchitectural design, an operating frequency, and available voltage domains to facilitate in outputting an optimized clock synthesis.

Another static technique can be applied during test phase of a processor chip. In one embodiment, a voltage assignment technique that balances power at test time is provided that can improve power efficiency of a processor with or without design-level optimizations.

Although multiple voltage domains (and even multiple frequency domains) may be used, pipeline power balancing does not require multiple frequency or voltage domains—and can be implemented with a single frequency and voltage domain.

A dynamic power balancing technique is also provided in which power balancing is performed at runtime of the processor. According to an embodiment, an operating system can keep track of the number of floating point instructions and adjust delays using a look-up table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DISCLOSURE

Systems and techniques are provided for implementing power balanced pipelines in processors. A design-level implementation and post-silicon level implementations are described herein.

Instead of performing delay balancing for pipelines, embodiments of the invention perform power balancing in order to optimize the energy efficiency. According to various embodiments of the invention, power balancing is performed using cycle time stealing. The cycle time stealing can be performed to deliberately unbalance the stage delays in favor of power balancing to reduce power in energy-constrained processors while providing substantially the same performance.

"Cycle time stealing" or "cycle stealing" refers to using (or "donating") a fraction of one pipeline stage's evaluation period (cycle time) to increase the amount of time another stage may use to perform its task. In the context of this disclosure, cycle time stealing shifts the cycle time from a lower power stage to a power hungry stage by delaying the clock signal at the input of the donating stage (giving it less time to evaluate) and at the output of the receiving stage (giving it more time to evaluate). For power-balanced pipelines, cycle time stealing moves delay around in the pipeline but keeps the total pipeline latency the same in order to avoid adversely affecting the operating frequency of the pipeline.

Figure 1:
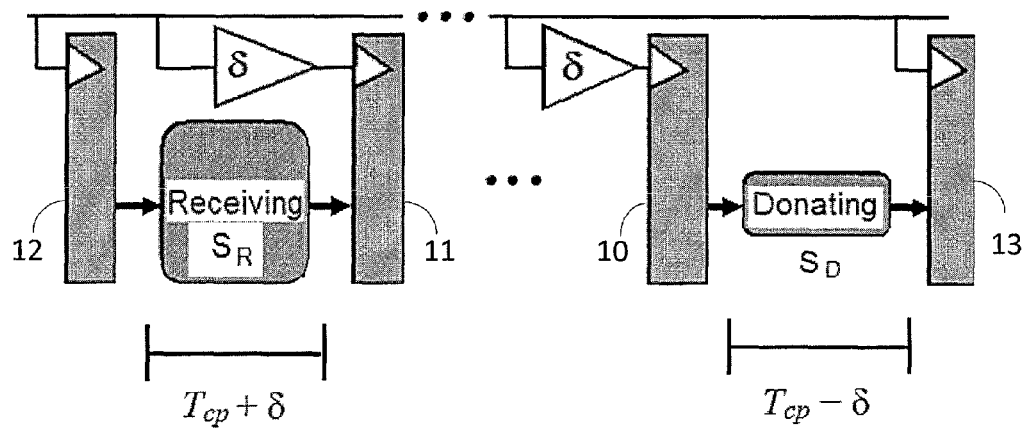
FIG. 1 shows a schematic diagram illustrating cycle time stealing according to an embodiment of the invention.

FIG. 1 shows a schematic diagram illustrating cycle time stealing according to an embodiment of the invention. Referring to FIG. 1, pipeline stages are generally defined with an associated clock tree network in which flip-flops are used at the input and output of each pipeline to ensure that data operated on within a pipeline stage is available at the designated time to be provided as input to a subsequent pipeline stage. Cycle time stealing can then be understood to be associated with a clock tree network (as part of clock tree synthesis during design level implementations or in association with tunable delay buffers as part of post-silicon solutions).

In operation, cycle time stealing re-distributes cycle time from a donating stage ($S_D$) to a receiving stage ($S_R$) by delaying the clock signal at the input flip-flop (FF) 10 of $S_D$ (allowing less time to evaluate) and the output FF 11 of $S_R$ (allowing more time to evaluate) by the same amount ($\delta$) as illustrated in FIG. 1. This delay is propagated between $S_R$ and $S_D$ by delaying the clock signals to all intervening FFs from $S_R$, up to and including the FF preceding $S_D$. Since clock signals at both the input and the output FFs of these stages are delayed by the same amount, their cycle times are unaffected. However, since the clock signal at the input FF 12 of $S_R$ is unchanged, $S_R$ now has an evaluation period of $T_{cp}+\delta$. Similarly, since the clock signal at the output FF 13 of $S_D$ is unchanged, $S_D$ now has an evaluation period of $T_{cp}-\delta$.

Figure 2A:
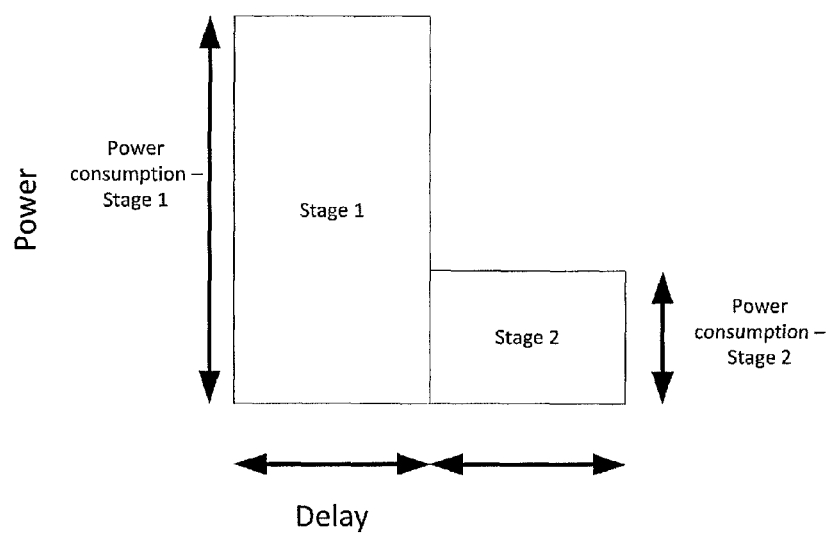
FIGS. 2A-2C illustrate power consumption for two representative microarchitectural pipeline stages in a shift from delay balancing to power balancing according to an example embodiment of the invention.
Figure 2B:
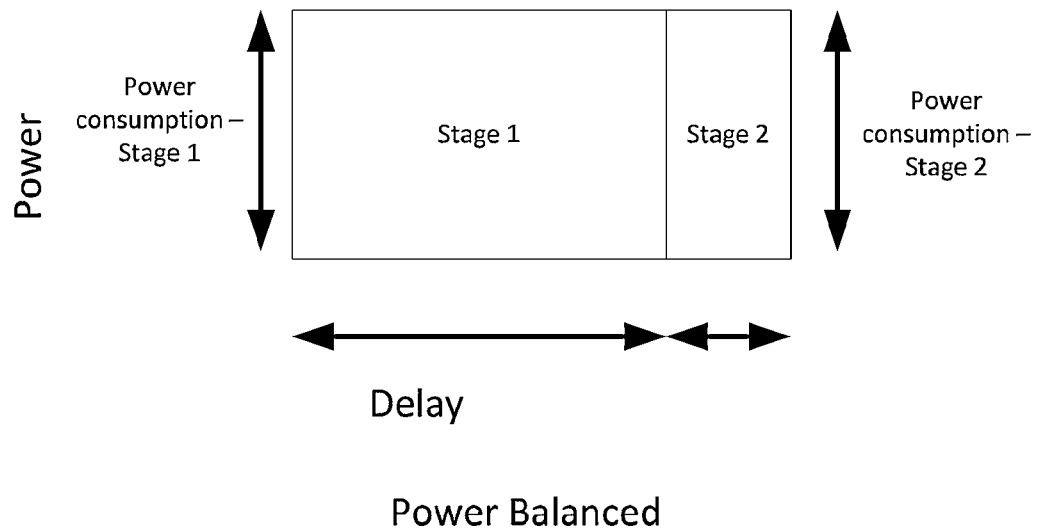
Figure 2C:
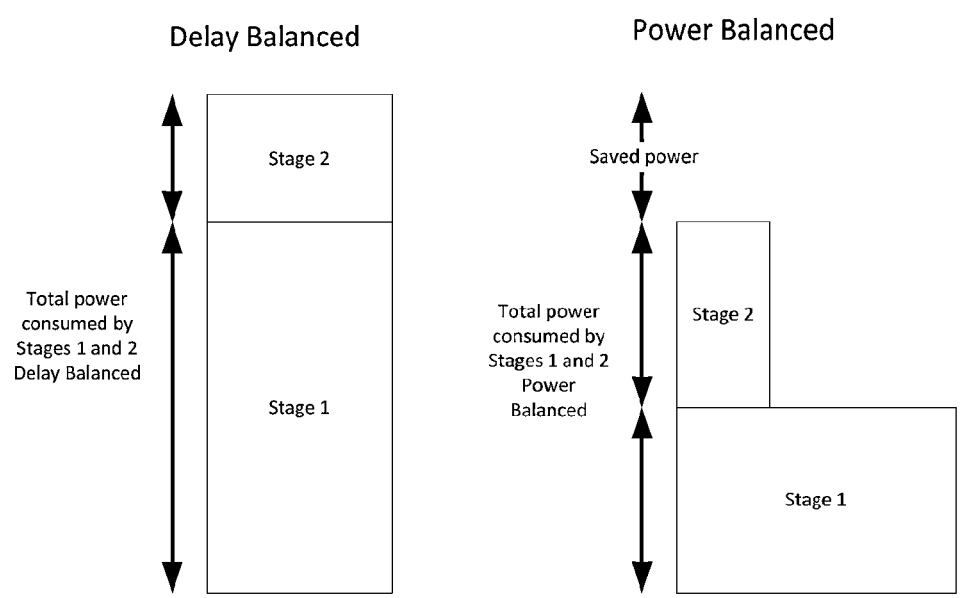

FIGS. 2A-2C and 3A-3C provide illustrations of how embodiments of the invention are able to increase efficiency. Two microarchitectural pipeline stages are shown in FIGS. 2A-2C, a low power stage and a high power stage. In a delay balanced configuration, the time (delay) of the two stages are made substantially equal. In contrast, in a power balancing approach, the delay can be unequal between stages in order to attempt to equalize power across stages.

As illustrated by FIG. 2A, delay balanced microarchitectural pipeline stages are typically unbalanced in power consumption. Although the delay of the two stages appears to be about the same, the power consumption for Stage 1 is significantly higher than that of Stage 2. This is represented by the height of Stage 1 being more than twice that of Stage 2, which is not uncommon in current processor designs. Referring to FIG. 2B, the power consumption in Stage 1 is reduced by "donating" cycle time (e.g., delay) from the lower power consuming Stage 2. Alternatively (or in addition), the power can be adjusted through voltage scaling (see Example "Voltage Scaling"). In FIG. 2B, it can be seen that the timing (e.g., the delay) for the first stage and the second stage are no longer balanced; instead, the height (representing power consumption) of the two stages is adjusted to reduce power consumption in a high power-consumption stage.

Figure 3A:
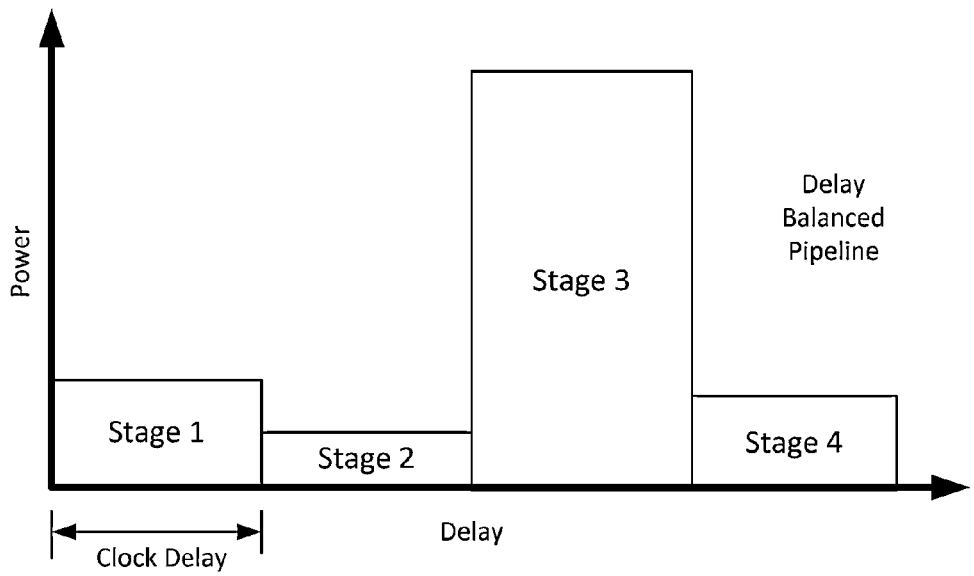
FIGS. 3A-3C illustrate power consumption for four representative microarchitectural pipeline stages in a shift from delay balancing to power balancing according to an example embodiment of the invention.
Figure 3B:
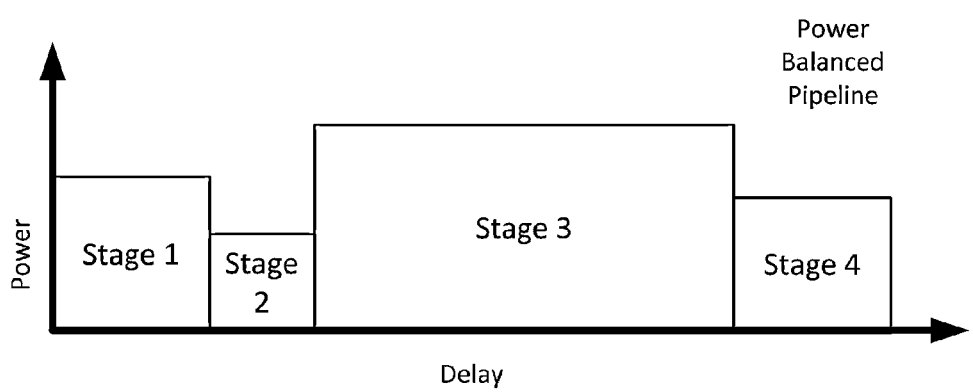
Figure 3C:
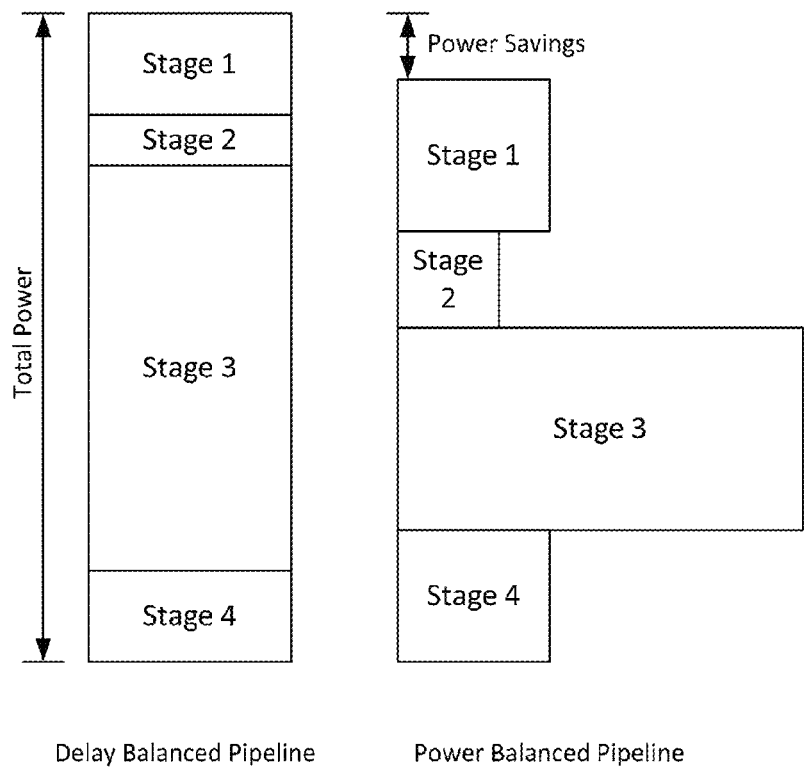

Although Stage 2 increases its power consumption due to the reduced cycle time, the reduction in total power comes from reducing the power consumption in Stage 1. Reducing the height of a tall bar (reducing the power of a high-power stage) has a significantly larger effect on total power than increasing the height of a short bar (increasing the power of a low-power stage). As illustrated in FIG. 2C, for a same total delay, the power balanced pipeline shown in FIG. 2B consumes less power than the delay balanced pipeline shown in FIG. 2A. FIGS. 3A-3C illustrate a same comparison, but with four stages instead of two.

As illustrated in FIGS. 2C and 3C, the total power of the delay-balanced pipeline and the power-balanced pipeline can each be obtained by summing up the power contributions from each of their respective stages.

For the example shown in FIG. 2A, Stage 1 may be consuming a large amount of power because of needing to meet a tight timing constraint, resulting in using fast, power-hungry cells and topologies to implement Stage 1. If it is possible to reduce the timing pressure on stage 1, it may be possible to use lower area, less power-hungry cells and topologies to implement the stage, which helps reduce the power consumption of Stage 1. However, if the delay of Stage 1 is just simply increased, a tradeoff in operating frequency may occur in that the operating frequency may need to be reduced.

In accordance with embodiments of the invention, "cycle stealing" can be used to steal time from Stage 2 and give it to Stage 1 (as shown in FIGS. 2A and 2B) without adversely affecting the operating frequency of the processor. In one embodiment, the cycle stealing can be performed by redistributing delay in the clock tree (i.e., the distribution of the clock signal) of the processor. Since the power consumption of Stage 1 is reduced by taking time from Stage 2, the timing constraints become tighter for stage 2. A tighter timing constraint for Stage 2 results in the need for faster, more power-hungry cells in Stage 2, increasing power consumption for the stage. However, even with the increase in power consumption for Stage 2, the power reduction of Stage 1 and the increase of power for Stage 2 are proportional to the original powers of the stages, resulting in an overall net power reduction (as illustrated in FIG. 2C).

Where there exists a power imbalance between two microarchitectural pipeline stages, there is the opportunity to reduce power consumption of a stage using power balancing. For many embodiments of the invention, the greater the power imbalance between stages, the greater the potential for power savings.

Because each microarchitectural pipeline stage in a delay balanced processor gets the same amount of time to complete—irrespective of its size or complexity, significant energy inefficiency can occur. For example, a data marshaling stage like Dispatch (in FabScalar) has lower area, timing criticality, complexity, and power than a large, complex stage such as Issue or Execute. In spite of this natural variance in complexity and area, when delay balancing is applied, all stages are expected to finish evaluating in the same amount of time. As a result, the more complex logic is implemented with larger, more leaky cells and expanded topologies that further increase power, thereby exacerbating the energy inefficiency.

Using a concrete example of Issue and Dispatch stages in FabScalar, a typical delay balanced pipeline of Issue and Dispatch Stages may have a total latency of 2.8 ns and total power of 5.1 mW. For example, Issue may consume 5.0 mW of power with assigned delay of 1.4 ns while Dispatch consumes 0.1 mW power with an assigned delay of 1.4 ns. However, by applying certain embodiments of the invention, Issue can be configured by "stealing" some cycle time from Dispatch, for example 0.6 ns. Then, the pipeline would still have the same total latency (2.8 ns), but a total power of 2.2 mW (2.0 mW for Issue and 0.2 mW for Dispatch), which is a reduction of 57%. As can be seen by the example, reducing the power of a power-hungry stage can impact total power significantly more than increasing the power of a low-power stage.

Although it is possible to perform the delay and power trades between stages, not all delay and power trades are allowed within the framework of microarchitecture-level cycle stealing, as some trades do not preserve correctness or instruction throughput.

To avoid effects on throughput or correctness, certain cycle time stealing constraints can be implemented. In general, an allowable trade involves two stages that participate in a common microarchitectural loop and keeps the total latency of all loops the same before and after trading. Accordingly, various embodiments of the invention take the loops into consideration in order to implement the power balancing methods. For example, to perform a trade between two stages, the stages are checked for being participants of a common loop. Most pipelines have different execution paths to accommodate different instructions. If two stages do not share a loop, certain embodiments do not permit delay to be traded between the stages. On the other hand, a stage may participate in multiple loops. Thus, time stealing within one loop may alter the latency of other loops. To avoid and/or minimize throughput implications, the total latency of each loop (s $T_{cp}$ for an s-stage loop) can be checked to ensure that the total latency remains constant before and after cycle time stealing.

Figure 4:
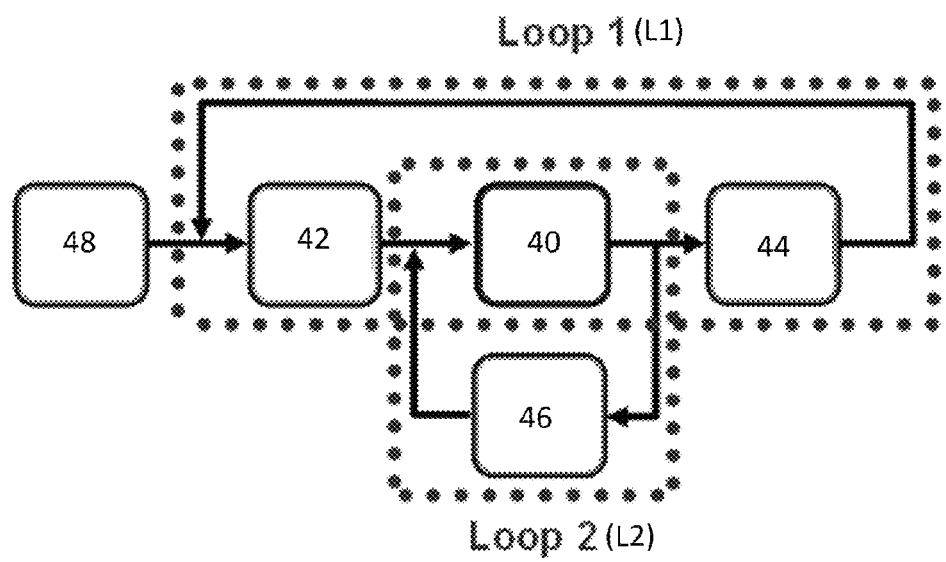
FIG. 4 shows a block diagram of a pipeline having two processing loops.

FIG. 4 shows a block diagram of a pipeline having two loops, Loop 1 ($L_1$) and Loop 2 ($L_2$). One of the constraints on cycle stealing is that loops in the processor should have the same total delay after cycle stealing as they did before cycle stealing. Otherwise, different parts of the pipeline will have different throughputs, and instructions could collide. As can be seen in FIG. 4, there are two loops and Stage 40 participates in both loops, where Loop 1 contains Stages 40, 42, and 44 and Loop 2 is a feedback loop containing Stage 40 and Stage 46. Before performing any cycle time stealing, the default delay for each stage may be $T=T_{cp}$.

Since stage 48 does not belong in either loop, time stealing is not carried out using delay associated with stage 48. If it is found that Stage 40 is a power hungry stage, one approach to perform power balancing is to steal half a cycle from each of the other two stages (42, 44) in the same loop, increasing the evaluation time for Stage 40 to 2T and reducing the evaluation time for Stages 42 and 44 to 0.5T.

Although this would maintain balance in the first loop $L_1$, Stage 40 is also in the second loop $L_2$. Therefore, Loop 2 is checked to ensure that it is also balanced. Because the delay of Stage 40 increased due to a trade within $L_1$, the delay of the feedback loop $L_2$ is decreased in order to maintain the original total amount of delay for the loop. Similarly, if the delay of stage 40 decreases due to a trade within $L_1$, the delay of the feedback loop $L_2$ is increased to restore its original delay.

Since there is only one other stage in the second loop $L_2$, any delay Stage 40 steals also needs to be absorbed by this other stage (Stage 46). Since balancing Loop 2 for a 2T evaluation time for Stage 40 would result in needing to reduce the evaluation time of Stage 46 to zero, a smaller amount of time will need to be stolen from the stages in the first loop to ensure that Stage 46 has a practical amount of time to perform its tasks. As can be seen from this example, a tight loop (such as with one or two stages) can limit the ability to perform power balancing.

In some cases a feedback loop may exist containing only a single stage—similar to the Loop 2, but without stage 46. To understand how the adjustment to stage 40 would then affect both loops, the feedback path in $L_2$, which contains an output FF feeding into an input FF (since no stage 46 is included in this example), can be thought of as a second stage. Therefore, the stage 40 and the feedback loop make up a 2-stage loop that gets balanced like any other loop. This implies that a stage with a feedback path into itself can only participate in cycle time stealing when its feedback path is from output FF to input FF. Even then, trading with the "feedback stage" is limited to a maximum of $T_{cp}$. However, with the example of Stage 40 stealing half a cycle from both Stage 42 and Stage 44, a 2T evaluation time would be effective because the feedback path would have up to $T_{cp}$ to give. In practice, since there is generally some delay in a feedback path, the maximum delay from the feedback path can be considered $T_{cp}-D$, where D is the minimum delay of the feedback path.). Therefore, in practice, a 2T–D evaluation time for stage 40 is the maximum evaluation time available.

When a stage steals cycle time, its critical paths are allowed longer than the clock period ($T_{cp}$) to evaluate. However, the input FF is still clocked every clock period. Thus, a stage may be evaluating multiple instructions during the same evaluation period. If a fast path were to cause a stage output to change before the output of the previous instruction had been sampled, data would be corrupted. Therefore, it is preferable for paths in a stage to satisfy a short path or hold time constraint ($D_{min} \geq \delta f - \delta i + T_{hold}$). The constraint on the minimum path delay allowable in a stage ($D_{min}$) depends on the amount by which the evaluation time of the stage has been extended ($\delta f - \delta i$) and the FF hold time ($T_{hold}$). Since the delay of the most power hungry stages could potentially be extended significantly, fast path buffering may be used for stages that steal cycle time or limits to the amount that can be "stolen" may be implemented.

According to embodiments of the invention, cycle time stealing can be implemented in a manner that after cycle time stealing, all loops have the same delay as before performing cycle time stealing. In certain cases, feedback paths that end up shorter than before can be corrected with the addition of delay buffers. Increased delay in a feedback may be corrected by adding in a dummy stage to take up the negative slack. However, since dummy stage insertion can degrade performance (e.g., instructions per cycle—IPC), preferred embodiments do not use this feature in the power balancing heuristics.

"Slack" refers to the available capacity in the pipeline before stalling, generally referred to as the number of tokens that can enter the pipeline before the pipeline stalls. A pipeline is considered to stall when there is a delay in executing an instruction due to waiting for another stage or instruction to resolve.

Since the ratio of power between pipeline stages is uneven for the different microarchitectural pipeline stages, donating cycle time to a power-hungry stage from a lower power stage results in processor power savings, even though processor frequency remains the same. Extra cycle time donated to a power-hungry stage enables voltage or area reduction. Although the voltage or area of the low-power, time donor stage increases, the power trade is uneven, resulting in a net power savings for the processor. Thus, by opportunistically creating slack in simple, low-power stages and consuming the slack in complex, high-power stages, embodiments of the invention are able to balance the power consumption of pipeline stages (i.e., reduce disparity in their power consumption) and significantly reduce total processor power for the same performance.

Cycle stealing and power balancing can be accomplished either by changing the timing constraints that microarchitectural pipeline stages will be synthesized for or by changing stage voltages. The better approach depends on the characteristics of a stage and embodiments contemplate the use of one or both approaches. For example, if a stage has high power due to tightly constrained critical paths, relaxing the timing constraint will typically be more effective. If high power is due to high area, a lower voltage may be more effective at reducing power. The same is true in reverse for determining the best way to donate cycle time in a stage.

The power balancing strategy for a particular processor pipeline may be determined by the relative amount of power consumed in each pipeline stage. Stages with high power relative to others can be adjusted by stealing cycle time from stages with relatively low power consumption. Dynamic fluctuations in the absolute power consumption of the stages do not matter, as long as the relative power breakdown remains roughly the same. For processors in which the relative power breakdown between stages remains fairly constant for different programs and program phases, a static power balancing approach does well at reducing total power, while keeping implementation overhead low. For example, processors in which the utilization of each stage depends on the utilization of the other stages (e.g., in-order processors) are well-suited for static power balancing. Static power balancing can be performed at design time, test time (post-silicon), or both.

In certain embodiments, pipeline power balancing is carried out during design-level implementation of a processor. In one embodiment, a power optimization module is provided that can be a software module that is a stand-alone tool or incorporated in (or along-side) existing modeling, simulation, and/or synthesis tools such as provided by Cadence Design Systems, Inc., Synopsys, Inc., the open source community, and the like.

The design-level power balancing methodology of embodiments of the invention considers trading cycle time and power through both re-synthesis and changing voltage.

Since delay and power can be traded by adjusting the timing constraints of pipeline stages at design time, multiple voltages are not required in a power balanced pipeline. However, in certain embodiments, multiple voltage domains can be used to increase power savings. Accordingly, in certain embodiments, the number of allowable voltage domains can be incorporated in the optimization algorithm.

When adjusting power of a stage using voltage domains, it is understood that voltage cannot be decreased indefinitely. Also, voltages of donating stages cannot be increased indefinitely due to, for example, aging considerations, since circuit aging is accelerated at higher voltages. Accordingly when multiple voltage domains are used, the use of very high and very low voltages may be avoided by establishing boundaries for acceptable voltages.

While power balancing does not require multiple voltage domains, benefits obtained through power balancing may improve with local voltage scaling, which can be facilitated by incorporating a voltage regulator for each stage. When a voltage regulator is in place at each stage, voltage and power reduction may be carried out for high-power stages, enabled by voltage increase and slack creation in low-power stages. Where local voltage scaling is implemented, routing considerations can be addressed in order to minimize cost. Local voltage scaling involves a separate network for each stage instead of a single voltage network feeding the pipeline. In practice, the overhead of creating separate voltage domains can be limited to acceptable levels by restricting the number of allowable voltage domains.

Voltage level conversion between stages may also be a concern. When a low-voltage stage feeds into a high-voltage stage, the signal from the low-voltage stage may not completely turn off an input transistor in the high-voltage stage, potentially creating a short circuit path. IN order to inhibit leakage due to voltage level conversion (e.g., static power increase due to short circuit path), the criteria that $\Delta V < V_t$ can be maintained. Thus, during optimization, voltage differentials may be checked and large voltage differentials between adjacent stages may be minimized to avoid excessive leakage.

According to one embodiment, a design-level power balancing computer-implemented method is provided that takes as input the hardware description register transfer level (RTL) for a microarchitectural pipeline, the desired operating frequency (f), and the number of allowable voltage domains ($N_V$), chooses the implementation and voltage for each microarchitectural pipeline stage such that processor power is minimized and the throughput target is met, and performs synthesis, placement, and routing (SPR) to implement the power balanced pipeline. The RTL model for the processor may be written in a hardware description language such as VHDL, Verilog, and systemVerilog.

In one embodiment, the design-level power balancing is implemented as an add-on tool or module in a simulation/routing tool.

Figure 5:
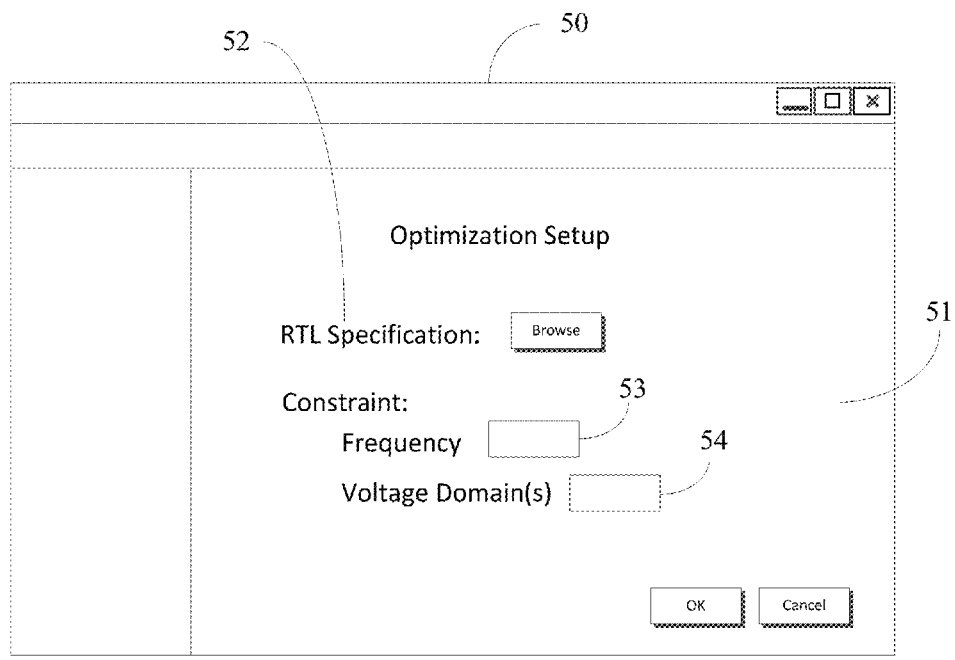
FIG. 5 illustrates an example graphic user interface (GUI) implementing a power optimization module according to certain embodiments.

FIG. 5 illustrates an example graphic user interface (GUI) implementing a power optimization module according to certain embodiments. A GUI allows a user to control a synthesis module's configurations including configurations selected for the power optimization module. The GUI can include a synthesis navigation window 50 that allows a user to select from among different features including an optimization setup interface 51 for controlling the modeling/synthesis tool.

The optimization setup interface 51 receives, as input to the power optimization module, a register transfer level (RTL) specification 52, e.g., in VHDL or Verilog or SystemVerilog code. The particular RTL specification can be entered in any suitable manner known in the art. For example, an available hardware description language (HDL) database can be searched to select particular RTL specification files for implementation of pipeline design (e.g., another window, drop down menu, or input field may be selected).

The optimization setup interface 51 can also receive, as input to the power optimization module, the implementation constraints, which provide the relevant criteria for guiding optimization. For example, in the illustrated implementation, a constraints setup option provides an input field 53 that enables a user to input values for a desired operating frequency (a type of timing performance) and an input field 54 that enables a user to input values for the number of allowable voltage domains.

It should be understood that the GUI shown in FIG. 5 is merely for illustrative purposes and should not be construed as intending to limit how and in what manner the RTL, operating frequency, and voltage domains are provided in order to carry out the power optimization heuristics.

Figure 6:
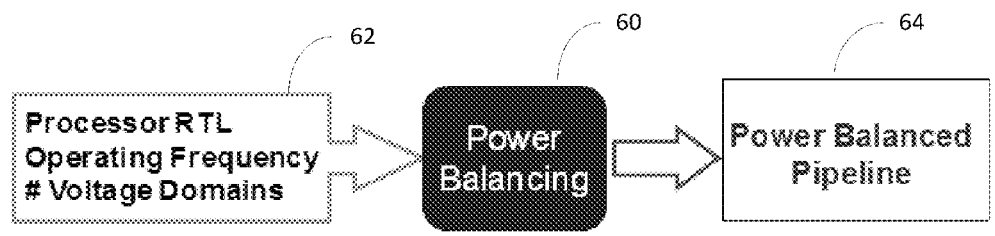
FIG. 6 shows a block diagram of a design-level process flow of an embodiment of the invention.

FIG. 6 shows a block diagram of a design-level process flow of an embodiment of the invention. Referring to FIG. 6, a design level implementation for a power optimization module includes a power balancing process 60 that takes as input a processor's RTL, the target operating frequency, and the number of available voltage domains 62 in order to performs power balancing for power balanced pipelines, and outputs a power balanced pipeline 64.

During design, the steps of SPR (synthesis, placement and routing) are carried out by taking each microarchitectural pipeline stage defined by a given RTL and optimizing the RTL for a particular objective. A heuristic approach can be applied to meet particular objectives related to timing, power, area, and routability. Since design-level power balancing changes how the processor is synthesized, benefits over a delay balanced pipeline can be in terms of both power and area reduction. In accordance with certain embodiments of the invention, during synthesis, a power balancing technique is applied to adjust the constraints across pipeline stages.

Figure 7A:
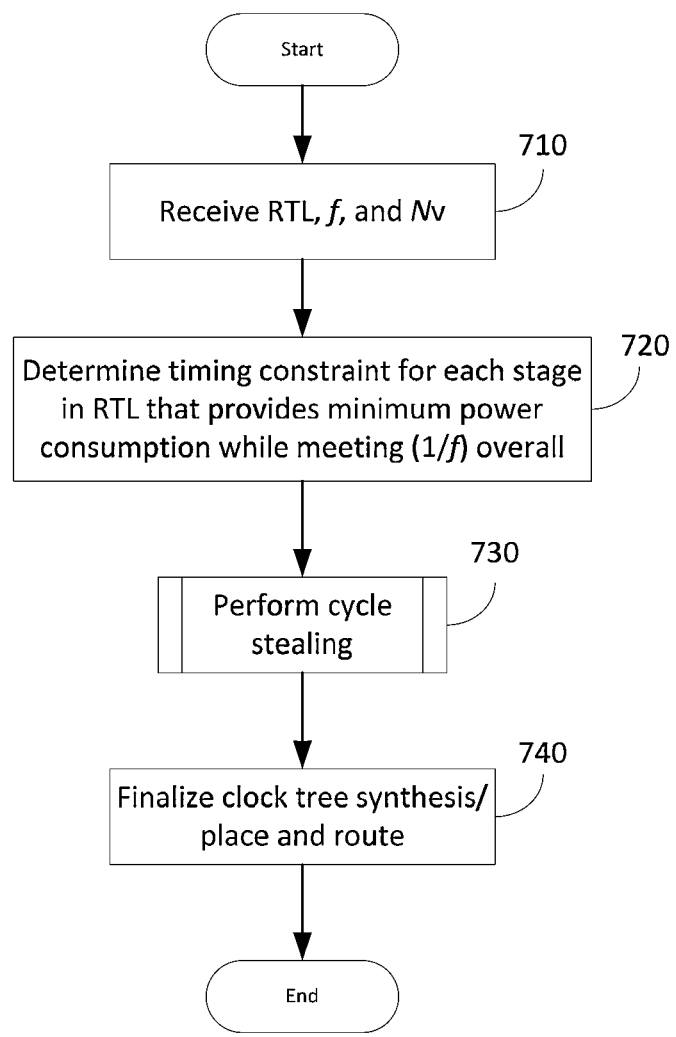
FIG. 7A shows a process flow of a design-level power balancing technique according to an embodiment.

FIG. 7A shows a process flow of a design-level power balancing technique according to an embodiment. A power optimization module (e.g., power balancing module 60) can be configured to carry out the process flow shown in FIG. 7A.

For example, the power optimization module can receive the RTL, f, and $N_V$ (710). To arrive at the minimum-power implementation for a power balanced processor pipeline, a first step 720 of the optimization heuristic first implements each processor pipeline stage for a range of possible timing constraints, and then selects the minimum-power implementation of each stage that meets timing (1/f).

Since design-level power balancing may require characterization of pipeline stages for multiple timing constraints, implementation time may increase proportionally with the number of additional design points. However, design time overhead can be reduced by limiting the number of timing constraints for which each stage is characterized or by performing characterization after synthesis (e.g., before routing) rather than after layout.

Then, after selecting the minimum power implementation of each stage that meets timing (1/f) in step 720, in a second step 730 of the heuristic, cycle stealing is performed between the stages to reduce power.

After minimum power implementations are chosen for each stage (730), final layout can be performed for the processor, including clock tree synthesis for the optimized cycle stealing strategy 740.

The cycle stealing 730 can be performed by selecting lower power versions of high-power stages and selecting higher power versions of low-power stages to satisfy cycle stealing constraints.

Since design-level power balancing is performed at design time, an exhaustive algorithm (Algorithm 1) may be used to evaluate all possible design choices during the step 730 and select the pipeline implementation with minimum power.

---

Algorithm 1 Exhaustive Power Balancing Algortihm 1. find_valid_datapoints(stage, loop_data);
2. for each datapoint ∈ valid_datapoints do
3.     update_stages(stage_data_copy, datapoint);
4.     update_loops(loop_data_copy, datapoint);
5.     if stage = NUM_STAGES then
6.         calculate_power_and_save(stage_data_copy);
7.     else
8.         recurse(stage + 1, stage_data_copy, loop_data_copy);
9.     end if
10. end for

---

Algorithm 1 begins by defining a range of datapoints (implementation, voltage pairs) that are valid for each stage, based on the constraints of the loops in which the stage participates.

A table can be included that contains information related to the available microarchitectural loops for a particular processor design. During the optimization/power balancing process, the table can be read to determine whether a stage is in a loop.

The "implementation" datapoint brings in the timing variable and can be obtained from the step 720 in which the optimization heuristic first implements each processor pipeline stage for a range of possible timing constraints, and selects the minimum-power implementation of each stage that meets timing (1/f). The voltage element of the datapoint range is controlled by the available voltage domains ($N_V$).

Cycle time stealing constraints focus on the slack for the loops. That is, as long as all loops have nonnegative slack, the design can be implemented. Each recursive call in the algorithm is associated with a stage in the pipeline. A call to the recurse function (e.g., line 8 of the Algorithm 1) passes on the stage configurations that have already been selected, along with the amount of slack available to each loop, given the choices that have been made for this specific implementation path.

A path is pruned (i.e. discarded) when no combination of voltage and/or timing constraints can be chosen for the current stage such that all loops still have non-negative slack. If a path reaches the final stage and is able to choose a datapoint that satisfies all loops, power savings are calculated and the data is saved if it is the best implementation found so far. The algorithm is complete when all paths have been completed or pruned. Runtime may be reduced by initially using a coarse voltage step granularity to identify the ranges of datapoints that allow for the most savings, then focusing in on the datapoints at successively finer granularities in subsequent calls to the algorithm. However, embodiments are not limited thereto.

Figure 7B:
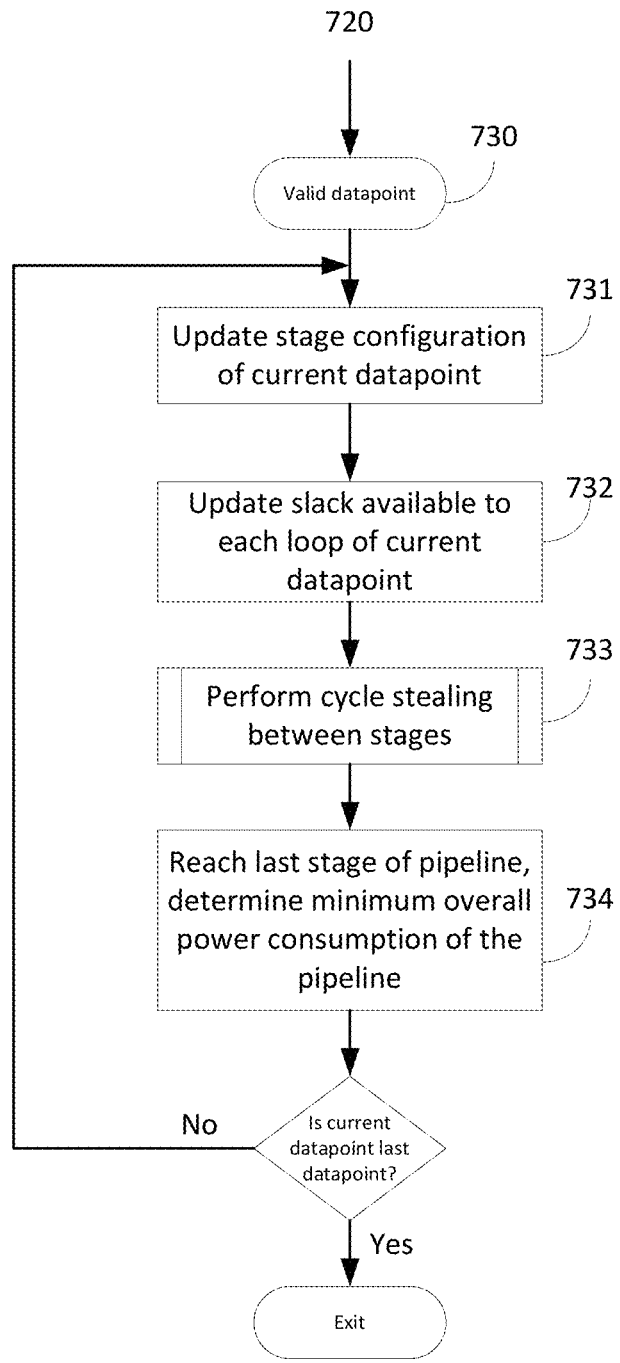
FIGS. 7B and 7C provide process flow diagrams for Algorithm 1 according to an embodiment of the invention.
Figure 7C:
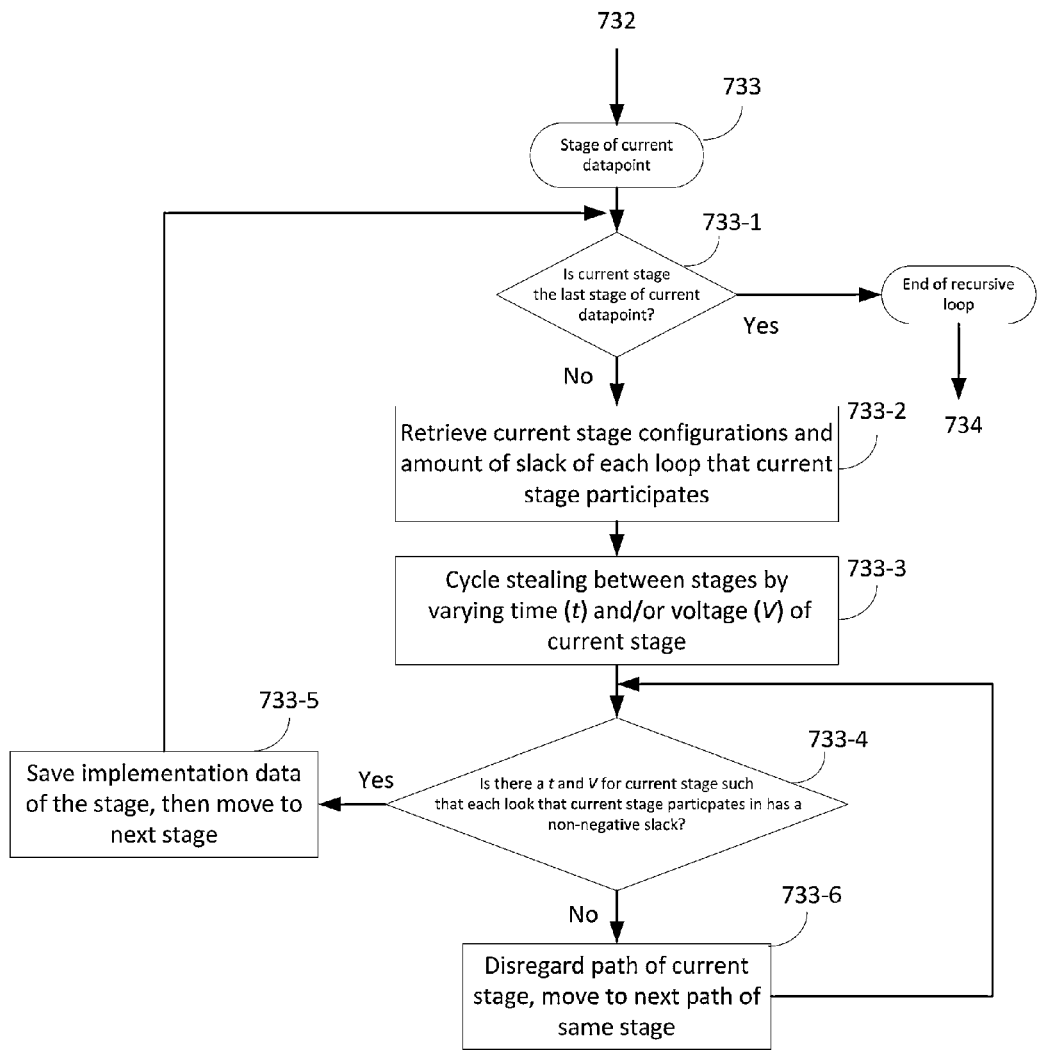

FIGS. 7B and 7C provide process flow diagrams for an embodiment implementing Algorithm 1.

Referring to FIG. 7B, starting with a first valid datapoint, the steps include updating the stage configuration of the current datapoint (731); updating the slack available to each loop of current datapoint (732); performing cycle stealing between stages (733); once the last stage of pipeline is reached, determining minimum overall power consumption of the pipeline (734); if the current data point is the last datapoint, then exiting, else performing the steps to a next datapoint. The cycle stealing between stages (733) may be performed as shown in FIG. 7C.

Referring to FIG. 7C, starting with a first stage of the current datapoint, if the current stage is the last stage of the current datapoint (733-1), ending the recursive loop and moving on to step 734; if the current stage is not the last stage of the current datapoint (733-1), retrieving the current stage configurations and amount of slack of each loop that the current stage participates in (733-2) and performing cycle stealing between stages by varying time (t) and/or voltage (V) of a current stage (733-3); if there is a combination of timing and voltage for the current stage such that each loop that the current stage participates in has non-negative slack (733-4), then saving implementation data of the stage and move to next stage to repeat the loop (733-5); else disregard path of current stage and move to next path of same stage to search find values satisfying the non-negative slack condition (733-6).

Although voltage domains may be used to provide an additional variable for optimizing the stages, improvements and power balancing can be accomplished even when $N_V=1$ (a single voltage domain). In this case, the design requires no additional hardware support for multiple voltage domains or post-silicon cycle time adjustment. When a single voltage domain is used, the cycle stealing is performed by optimizing the timing constraints of the stages during SPR and adjusting the evaluation times of the stages in clock tree synthesis. Thus, power is reduced with respect to a delay balanced pipeline without any significant implementation overheads. This is especially beneficial when the number of allowable voltage domains is limited.

The power and delay of a stage can be varied either by choosing an implementation with a different timing constraint or choosing a different voltage for the currently selected implementation (or both).

Circuit delay is inversely related to the voltage supplied to the circuit. For example, $$\text{Delay} \propto \frac{V}{(V - V_t)^\epsilon},$$

where V is drain voltage, $V_t$ is threshold voltage, and $\epsilon$ is a technology-ependent constant.

Figure 8:
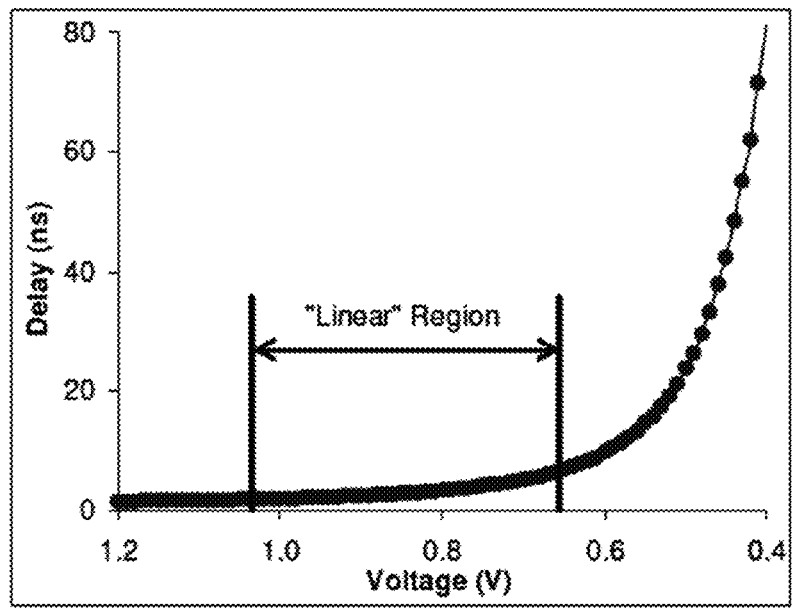
FIG. 8 shows an example delay vs. voltage curve.

FIG. 8 shows an example delay vs. voltage curve, which represents the Issue stage of the FabScalar pipeline. As V approaches $V_t$, there exists a voltage after which delay begins to rise sharply, even for a small reduction in voltage. Similarly, there exists a voltage after which increasing the voltage, even by a large amount, only results in a small decrease in delay.

Power balancing heuristics of embodiments of the invention, which select the most power-efficient voltage and delay for each stage, can avoid these two regions and choose voltages in the "linear" region of the delay vs. voltage curve.

Figure 9A:
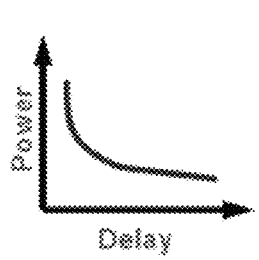
FIGS. 9A-9C illustrate a design-level process flow for performing power balancing according to an embodiment of the invention.
Figure 9B:
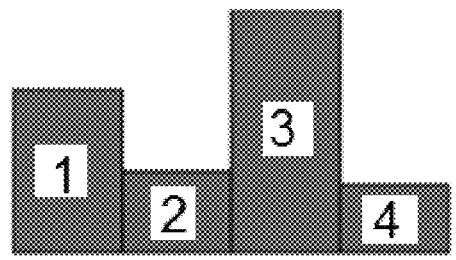
Figure 9C:
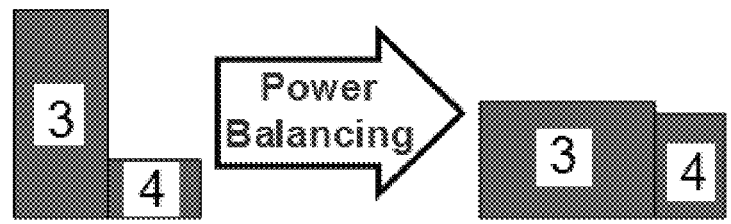

FIGS. 9A-9C illustrate a design-level process flow for performing power balancing according to an embodiment of the invention. In order to perform the power balancing heuristic, each pipeline stage is characterized in order to determine which power and delay trades will be beneficial. According to one embodiment, each pipeline stage is characterized in terms of power versus delay (FIG. 9A) by, for example, performing a synthesis exploration for different timing constraints and characterizing those synthesized circuits at different voltages.

Next, a delay balanced pipeline is obtained as shown in FIG. 9B. This pipeline is selected to meet a specified timing constraint while consuming minimum power. Then, as shown in FIG. 9C, power balancing is performed on the minimum power, delay balanced pipeline of FIG. 9B by stealing time from low-power stages and donating it to stages with higher power. This allows the higher power stages to operate at a lower voltage or use a looser timing constraint during synthesis. In order to perform delay trading between stages, a constraint may be included in which delay trading is only permitted when the stages are in a common microarchitectural loop and the total delays of all loops are the same before and after the trade.

Once power balancing determines the minimum-power implementation of the pipeline with a valid cycle stealing strategy, the design parameters can be passed to a computer aided design (CAD) tool to perform the SPR (synthesis, placement, and routing) for the design, including clock tree synthesis for the chosen cycle stealing strategy.

The CAD tool may be a separate tool from the power balancing tool or the power balancing can be carried out within a CAD tool. Design-time power balancing can be considered a static cycle time stealing because once an optimum arrangement is determined, the arrangement is set (i.e. static) and does not change.

For post-silicon adaptation for power balance, certain embodiments utilize tunable delay buffers and/or support for dynamic voltage scaling (DVS), which are commonly present in current chips. One post-silicon application is a static technique that can be implemented during a test phase of a chip.

For example, power balancing can be achieved through post-silicon static voltage assignment (and/or variable/tunable delay adjustment). With this approach, the processor can be designed in any suitable manner (with or without power balancing), and the voltages and delays of the stages are selected at test time to balance the power of the pipeline and reduce total power.

Processor designs incorporating DVS and/or multiple voltage domains and/or tunable delay buffers can have power balancing applied during testing phase.

Once the power balancing strategy is chosen in accordance with embodiments of the invention, inputs to delay and voltage select lines are set or fuses are burned to finalize the cycle time stealing strategy for the chip.

Figure 10A:
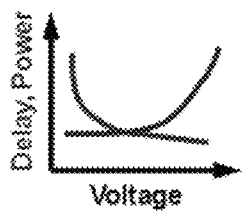
FIGS. 10A and 10B illustrate a test-phase process flow for performing power balancing according to an embodiment of the invention.
Figure 10B:
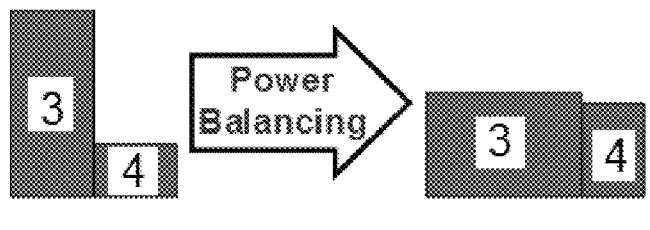

FIGS. 10A and 10B illustrate a test-phase process flow for performing power balancing according to an embodiment of the invention. To perform power balancing at the test-phase, power and delay vs. voltage is characterized for each stage during chip testing (FIG. 10A). Then, as illustrated by FIG. 10B, the power balancing is performed in the characterized chip stages. Based on the power balancing determination, voltage assignments are determined that minimize the total power and fuses are burned (or inputs to delay and voltage select lines are set) to finalize the voltage and cycle time stealing configurations for the chip.

Figure 11:
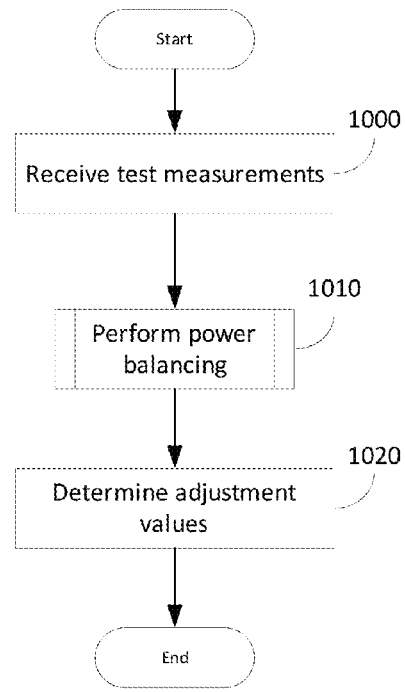
FIG. 11 shows a process flow for a test phase power balancing scheme according to an embodiment of the invention.

FIG. 11 shows a process flow for a test phase power balancing scheme according to an embodiment of the invention. As shown in FIG. 11, test measurements of the chip are received (1000); calculations, using the measurements as a baseline, are performed to optimize power efficiency (1010); and adjustment values are obtained (e.g., for voltage scaling and/or variable delay buffer adjustment) (1020) for providing to equipment that can set the voltage and/or delay features on the chip.

The optimization can be carried out similar to the one described in Algorithm 1 (with only one implementation per stage) to select the cycle stealing and voltage assignment strategy that minimizes total power. A copy of the processor design (and RTL) may be stored or accessed by the system performing the optimization and the test measurements obtained through testing associated with the corresponding stage in the processor design.

Post-silicon static voltage assignment may increase testing time if an exhaustive power balancing algorithm is used. However, the time required to find a suitable power balancing strategy can be reduced to negligible levels by using an optimization heuristic. For example, Algorithm 2 describes a fast power balancing heuristic that performs gradient descent to approach the minimum power configuration.

---

Algorithm 2 A Fast Gradient Descent-based Power
Balancing Heuristic for Reducing Time Overhead

---

1. for each stage do
2.     stage_data[stage].voltage = MAX_VOLTAGE;
3. end for
4. while (stage = max_savings_stage(stage_data)) ≠ −1 do
5.     stage_data[stage].voltage = stage_data[stage].voltage − $v_{step}$;
6.     update_loops(stage_data);
7. end while

---

First, all stages are set to the maximum voltage, such that delay is minimized. Then, for each stage, the potential power savings of reducing the voltage to the minimum value is calculated such that all loops constraints are met. The direction of steepest descent is followed by reducing the voltage by a small amount (for example, $v_{step}=0.01V$) on the stage that has the highest potential power savings. Gradient descent continues until no stage can reduce its voltage without breaking a loop constraint. This heuristic avoids local minima by computing the total potential power savings for a stage, rather than the savings for a small change in voltage. This inhibits the heuristic from choosing stages that present significant savings in the short run but consume too much delay in the process. This also inhibits the heuristic from getting stuck due to noise in the characterization data. The power savings achieved by this fast heuristic are typically within 3-5% of the exhaustive algorithm's savings, and runtime is reduced significantly (to less than 1 ms).

The post-silicon static power balancing can also be used to overcome inefficiencies caused by process variations. Instead of focusing on rebalancing delay due to degradation caused by process variations, delay is intentionally unbalanced in order to balance power consumption and reduce total power.

The hardware overheads associated with post-silicon static voltage assignment can be reduced by limiting the number of voltage domains, or even by implementing the cycle stealing and voltage assignment strategy at design time. In this scenario, static voltage assignment could be viewed as a limited case of design-level power balancing that only considers a single implementation of each stage, optimized for the target frequency of the processor.

In addition to post-silicon static cycle time stealing, embodiments of the invention contemplate dynamic cycle time stealing configurations that take advantage of tunable delay buffers.

For processors in which the relative power breakdown between microarchitectural pipeline stages may change due to changes in the workload, dynamic power balancing may afford additional power reduction over static power balancing. This is because the optimal power balancing strategy depends on which stages consume the most power.

Dynamic power balancing can apply to dynamic changes in the relative power breakdown for any pipeline stages during processor operation by using select indicators of how that breakdown changes. The dynamic changes may occur due to workload changes, thermal runaways and the like.

A processor that contains a unit for which utilization depends strongly on the program or program phase (e.g., a floating point unit (FPU)) can potentially benefit from adapting the power balancing strategy during runtime. The mechanisms used to adapt stage power and delay dynamically can be similar to those used for post-silicon voltage assignment. However, to allow dynamic adaptation, the select lines for tunable delay buffers and DVS are controlled by the operating system (OS) or a simple hardware controller.

In one embodiment, in order to determine when to rebalance power, a performance indicator and look-up table are used. The performance indicator can be a performance counter. The performance counter can be used to determine a relative power breakdown of the processor during run-time. In certain embodiments, multiple performance counters (of different types) are used. One or more sensors may be used in place of or in addition to the one or more performance counters. Thus, one or more performance indicators may be used during run-time power balancing.

For example, based on a collection of performance counter and/or sensor values, the relative power breakdown of the processor can be determined. The relative power breakdown can then determine how the cycle stealing is performed to minimize power consumption. The cycle stealing (power balancing) strategies can be stored in the look-up table, and the performance counter/sensor values map to the select bits that select a certain look-up table entry.

An arbitrary number of entries can be provided in the look-up table corresponding to different power balancing (cycle stealing) configurations. To reference into the table, a mixture function can be used that combines an arbitrary number of performance counters and/or sensor values to select a particular power balancing configuration (e.g., select a particular entry in the look-up table).

In another embodiment, the look-up table can be omitted and the processor can perform the calculations to determine a best power balancing configuration at runtime (following, for example, the cycle stealing strategy of algorithm 1 or 2 described above).

In one embodiment, for a processor in which large changes in the power consumption ratio occur when the FPU is engaged, the power balancing strategy is changed when the power consumption of the FPU changes by using the number of floating point (FP) instructions executed in a given time slice.

For example, a performance counter can be used to count the number of FP instructions committed within a fixed period of time in order to identify a FP-intensive program phase. Since the number of committed FP instructions provides an estimate of FPU energy, measuring the count over a fixed period of time (such as an OS timeslice) gives an estimate of FPU power. Based on the number of FP instructions in the time window (FPU power), the power balancing strategy is dynamically adapted to shift power and delay into or out of the FPU.

It can be assumed that the FPU is part of architectural loops that contain other pipeline stages. Based on observations regarding the granularity of adaptation for the test workloads that indicate hundreds of milliseconds, an OS-based power balancing mechanism can be implemented that counts the number of FP instructions committed in an OS timeslice (e.g., 5 ms), and decides whether power should be re-balanced.

According to an embodiment, the dynamic power balancing uses the FP instruction count to reference into a look-up table that stores the voltage and delay assignments for each stage in each configuration. When rebalancing is needed, the OS assigns the stage voltages and delays loaded from the table.

Figures 12A, 12B:
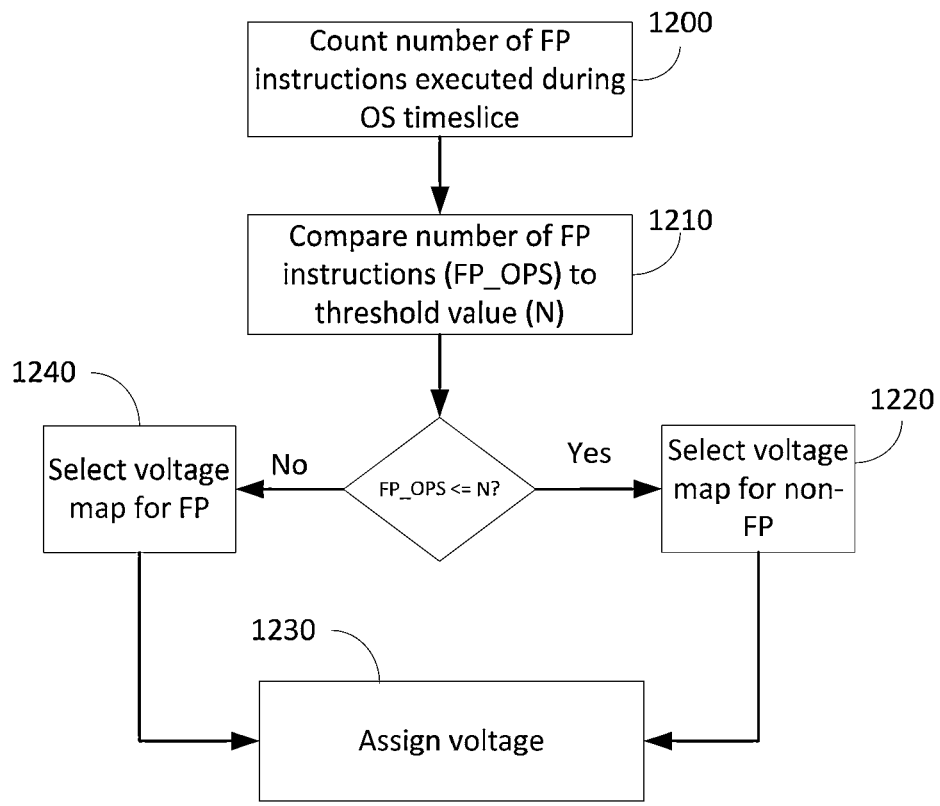
FIG. 12A shows a process flow for dynamic power balancing according to an embodiment of the invention
FIG. 12B shows an example look-up table for a run-time process for performing power balancing according to an embodiment of the invention.

FIG. 12A shows a process flow for dynamic power balancing according to an embodiment of the invention. Referring to FIG. 12A, the number of FP instructions that are executed during an OS timeslice is counted (1200). The FP instruction count is compared to a threshold value (1210) and the output bit of the comparison is used to reference into a table such as shown in FIG. 12B that stores the optimal voltage maps for FP and non-FP phases. For example, if the FP instruction count (FP_OPS) is less than or equal to the threshold, then the voltage map representing a non-FP stage can be selected (1220) and used to assign voltages (1230). If the FP instruction count (FP_OPS) is greater than the threshold, then the voltage map representing a FP stage can be selected (1240) and used to assign voltages (1230).

Once the correct mapping is selected, the voltages can be assigned to cores and execution of instructions for a workload can continue.

In practice, the binary non-FP and a FP configuration can be used because the non-FP stages indicate a fairly stable power breakdown, indicating that static power balancing could be sufficient for non-FP instructions. Thus, a single comparator can be used to select the appropriate power balancing configuration to load from a two-entry look-up table.

According to another implementation, an arbitrary number of entries can be provided in the look-up table corresponding to different power balancing (cycle stealing) configurations.

In another embodiment, dynamic power balancing can be performed according to dynamic changes in the consumption of the cache relative to other portions of the processor. In one such embodiment, a performance counter that counts the number of accesses to the cache can be used to estimate the relative power consumption of the cache over a given timeslice.

In another such embodiment, other performance counters (e.g., number of cache hits) can be used to estimate power consumption of the cache over a given timeslice. Using the cache access performance value(s), a reference into the look-up table that stores the different power balancing (cycle stealing) configurations can be calculated.

As another example, a sensor can be incorporated to provide other measures for estimating the power consumption of each pipeline stage. For example, on-chip current can be detected and/or temperature sensors (or other sensors) may be used for estimating the power consumption of each pipeline stage. Based on the sensor values, the relative power breakdown for the processor can be determined. Then, based on the relative power breakdown, the appropriate power balancing (cycle stealing) strategy that minimizes processor power can be referenced, for example in a look-up table.

The dynamic power balancing can result in the best benefits when the fraction of power consumed by a stage varies dynamically. For example, dynamic power balancing can improve power efficiency where a stage consumes a significant fraction of total processor power and the utilization of the stage varies significantly, and somewhat independently, from the rest of the pipeline.

EXAMPLES

Example: Experimental Setup and Simulations

The FabScalar framework is used to evaluate power balanced pipelines of embodiments of the invention. FabScalar is a parameterizable, synthesizable processor specification that allows for the generation and simulation of RTL descriptions for arbitrarily configured scalar and superscalar processor architectures. For the evaluations, benchmarks from the Standard Performance Evaluation Corporation (SPEC) benchmark suite (INT, bzip, crafty, gap, mcf, parser, twolf, vortex, FP, ammp, art, equake, swim, wupwise) are executed for 3 billion cycles.

Figure 13:
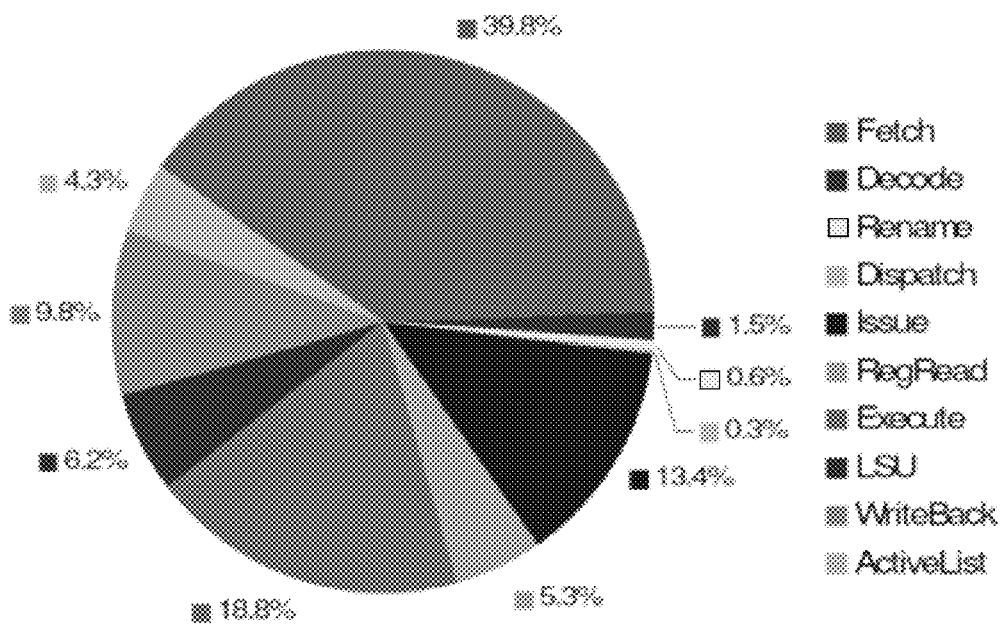
FIG. 13 shows the average power breakdown for a workload of SPEC benchmarks into the stages of the baseline FabScalar pipeline used in the experiments.

FIG. 13 shows the average power breakdown (for a workload of SPEC benchmarks) into the stages of the baseline FabScalar pipeline used in the experiment examples. Canonical pipeline states include Fetch, Decode, Rename & Retire, Dispatch, Issue, Register read (RegRead), Execute, and WriteBack/Bypass.

Floating Point (FP) benchmarks are primarily used to evaluate dynamic power balancing since the FabScalar architecture does not contain a FPU. Benchmarks are executed on a synthesized, placed, and routed FabScalar processor after fast-forwarding the benchmarks to their Sim-points as described by Hamerly et al. in "Simpoint 3.0: Faster and more flexible program analysis (JILP 2005). Table 1 gives the microarchitectural parameters of the FabScalar pipeline that was implemented.

TABLE 1

| Processor Microarchitecture Parameters. | | | |
| --- | --- | --- | --- |
| Fetch Width | ALU | IQ Size | ROB Size |
| 1 | 1 | 16 | 64 |
| Phys Regs | LSQ Size | Dcache | Icache |
| 64 | 16 | 32 kB | 32 kB |

Power balanced pipelines are compared against two different baselines. The first baseline is a conventional design that has been leakage optimized by a CAD flow for minimum power in accordance with an embodiment of the invention. Since cycle stealing is used as a mechanism for power balancing, the power balanced pipelines are compared against a second baseline that takes the original synthesized, placed, and routed design and performs cycle stealing to maximize the frequency of the processor. When comparing against the second baseline, power balancing is evaluated at the highest frequency achievable by the cycle stealing performance-maximized baseline.

Designs are implemented with the TSMC 65GP standard cell library (65 nm), using Synopsys' DESIGN COMPILER platform, a registered trademark of Synopsys, Inc., for synthesis and the CADENCE SoC ENCOUNTER platform, trademark and registered trademark of Cadence Design Systems, Inc., for layout. In order to evaluate the power and performance of designs at different voltages and to provide Vth sizing options for synthesis, CADENCE ENCOUNTER library characterizer, a registered trademark of Cadence Design Systems Inc., was used to generate low, nominal, and high $V_{th}$ cell libraries at each voltage ($V_{dd}$) between 1.2V and 0.4V, at 0.01V intervals. Power, area, and timing analyses were performed using the SYNOPSYS PRIMETIME platform, a registered trademark of Synopsys, Inc. Gate-level benchmark simulation was performed with the CADENCE NC-VERILOG platform, a registered trademark of Cadence Design Systems, Inc., to gather activity information for the design in the form of a value change dump (VCD) file, which was subsequently used for dynamic power estimation.

The designs were implemented using cell libraries that guard-band for worst case process, voltage, and temperature (PVT) variations (V=0.9V [$V_{nominal}$=1.0V], T=125° C., process=SS). This is standard practice in industry to ensure that designs operate correctly, even in the presence of variations. The benefits of power balanced pipelining are evaluated assuming worst case variations. This is a fairly conservative methodology, since it minimizes any additional slack that might have been advantageous for cycle stealing. Note that post-silicon voltage assignment and dynamic power balancing could potentially achieve more power savings by adapting to process variations. However, this potential was not evaluated by the experiments described here.

Since static random access memory (SRAM) structures are already typically optimized for and operated at their lowest possible voltages on a separate voltage rail, SRAM power reduction is not targeted with the power balancing techniques described herein. Consequently, processor-wide power savings that consider core logic and SRAMs are de-rated by the fraction of processor power consumed in SRAMs. Accordingly, CACTI (see S. Thozlyoor et al. Cacti 5.1, Technical report, HP Labs, 2008) with smtsim described by D. M. Tullsen "Simulation and modeling of a simultaneous multithreading processor ($22^{nd}$ Annual Computer Measurement Group Conference, 1996) and Wattch (see D. Brooks et al. Wattch: A framework for architectural-level power analysis and optimizations, ISCA, pp 83-94, 2000) are used to estimate the fraction of processor power consumed in SRAMs.

Example—Design-Level Power Balancing

Figure 14:
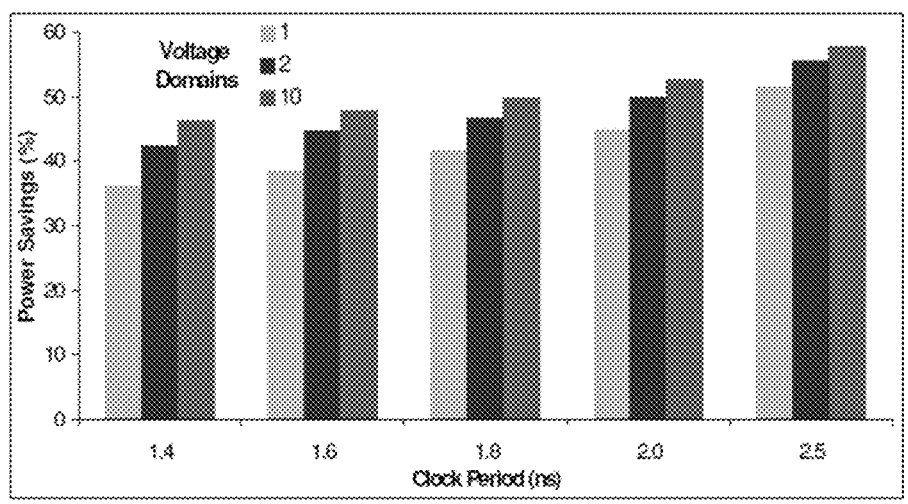
FIG. 14 shows a bar graph indicating power savings of design-level power balancing performed in an example embodiment using a baseline of a delay balanced pipeline as the clock period and the number of voltage domains increase.

FIG. 14 shows a bar graph indicating power savings of design-level power balancing performed in an example embodiment using a baseline of a delay balanced pipeline as the clock period and the number of voltage domains increase. Each bar graph pair represents total processor power savings achieved by design-level power balancing with respect to a delay balanced power-optimized pipeline for the same operating frequency. Results are provided for different operating frequencies (clock periods). At nominal voltage, the fastest attainable clock period for the processor is 1.4 ns. A comparison of power savings is also provided for an unlimited number of voltage domains (one per stage) against cases where only one or two voltage domains are allowed.

As FIG. 14 demonstrates, the power savings afforded by balancing pipeline power rather than delay can be significant—even when only a single voltage domain is used. Power savings increase for higher clock periods because designs are less tightly constrained at higher clock periods, allowing more flexibility to perform cycle time stealing. This is especially helpful for design-level power balancing, because the added flexibility allows more options for trading power and delay by changing the design implementation, which may be more efficient in some scenarios than changing the voltage.

For example, in several instances, low-power stages donate cycle time by taking advantage of design implementations with tighter timing constraints, rather than operating at an increased voltage. When possible, tightening the timing constraint can result in less power overhead than increasing the voltage, because tightening the timing constraint mostly increases leakage on the critical paths of a design (i.e., the main signal paths), while increasing the voltage increases power for the entire design.

Power savings also increase as more voltage domains are allowed, since each stage operates closer to its optimal voltage. Advantageously, reducing the number of voltage domains does not significantly hinder power savings. On average, allowing only two voltage domains reduces power savings by only 3% from the per-stage voltage domain case (indicated by 10 voltage domains). Even for a single voltage domain design, power savings are only reduced by 8%, on average. This is an encouraging result, since it indicates that power balancing has the potential to achieve significant power savings without design overheads for additional voltage domains. Also, since cycle time stealing can be accomplished in clock tree synthesis, design-level power balancing with a single voltage domain has no appreciable hardware overheads compared to a conventional delay balanced pipeline, other than hold buffering, which increases area and power by less than 2%.

Embodiments of the subject design-level power balancing do not significantly affect area. On average, the area of a design-level power balanced pipeline is within 2% of that of a delay balanced pipeline.

Figure 15:
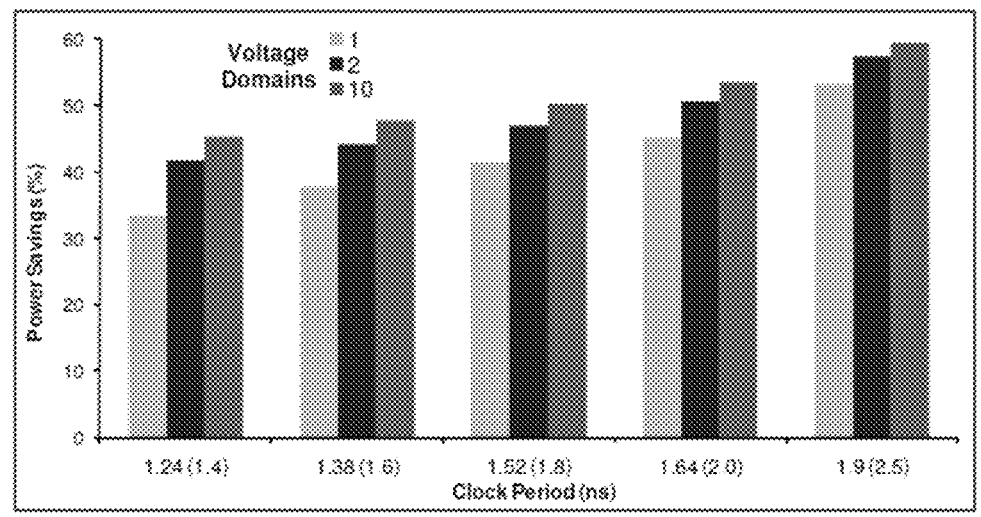
FIG. 15 shows a bar graph indicating power savings of design-level power balancing performed in an example embodiment using a baseline of a power-optimized pipeline and cycle stealing to maximize performance (frequency). The numbers in parentheses are the corresponding clock periods for the power-optimized baseline.

The benefits of power balancing was also evaluated over a FabScalar baseline that takes the original synthesized, placed, and routed design and performs cycle stealing to maximize the frequency of the processor. FIG. 15 shows the results. In particular, FIG. 15 shows a bar graph indicating power savings of design-level power balancing performed in an example embodiment using a baseline of a power-optimized pipeline and cycle stealing to maximize performance (frequency). The numbers in parentheses are the corresponding clock periods for the power-optimized baseline.

As can be seen in FIG. 15, the benefits of power balancing increase for the cycle stealing-based performance-maximized baseline. This is because while cycle time stealing does indeed improve the frequency of the baseline processor (for example, the minimum clock period of the baseline decreased by 12%-1.4 ns to 1.24 ns), resulting in increased power for the corresponding power balanced pipeline (since microarchitectural loops are now tighter), the performance maximized baseline consumed 15% more power, on average, than the power-optimized baseline, for clock periods between 1.4 ns-2.5 ns. This led to higher relative benefits from power balancing. On an ancillary note, the results also show that the power-optimized baseline is more power efficient than a cycle time stealing-based performance maximized baseline for the FabScalar design.

Power balancing may, in some cases, save power even when cycle stealing cannot increase performance. Consider an example processor with 2 pipeline stages where both stages have equivalent delay, but Stage 1 consumes 10× more power than Stage 2. Although the performance of this design is not increased with cycle stealing, power balancing can significantly reduce the power.

Example—Post-Silicon Static Voltage Assignment

Figure 16:
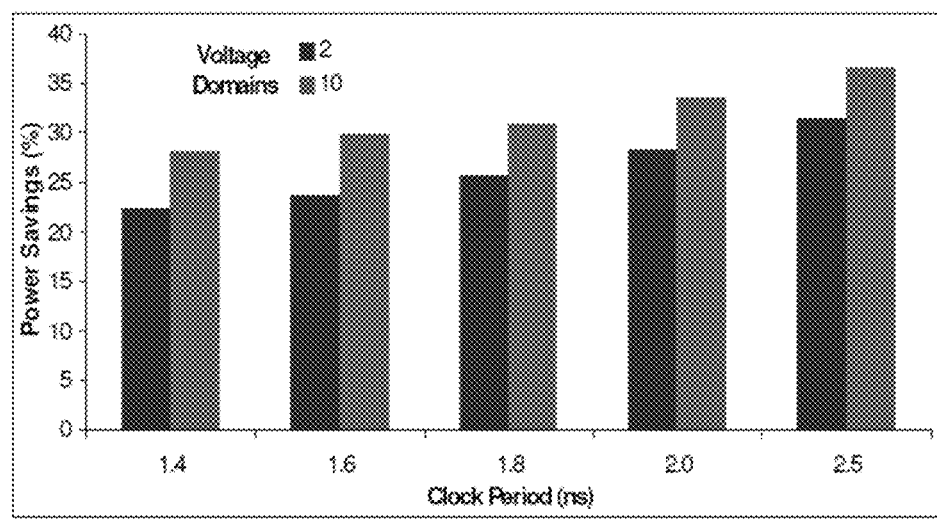
FIG. 16 shows a bar graph indicating total processor power savings achieved by a power balanced pipeline that employs post-silicon static voltage assignment, with respect to a delay balanced pipeline.

FIG. 16 shows a bar graph indicating total processor power savings achieved by a power balanced pipeline that employs post-silicon static voltage assignment, with respect to a delay balanced pipeline.

As shown in FIG. 16, power balancing through post-silicon voltage assignment reduces processor power significantly. The results are shown for different operating frequencies and numbers of voltage domains.

As in the design-level case, benefits increase with the clock period and the number of voltage domains. On average, allowing per-stage voltage domains increases power savings by 5.5% compared to the dual voltage rail case. Power savings are lower (20%, on average) than those of design-level power balancing because the implementation for a given frequency is fixed.

Adapting the design-level implementation can be beneficial for several low-power stages that donate cycle time. Some benefits of post-silicon voltage assignment over design-level power balancing are the reduced design time and the potential to achieve additional benefits by adapting to process variations, if they are significant. The results provided here do not account for adaptation to process variations and therefore present conservative values.

Figure 17:
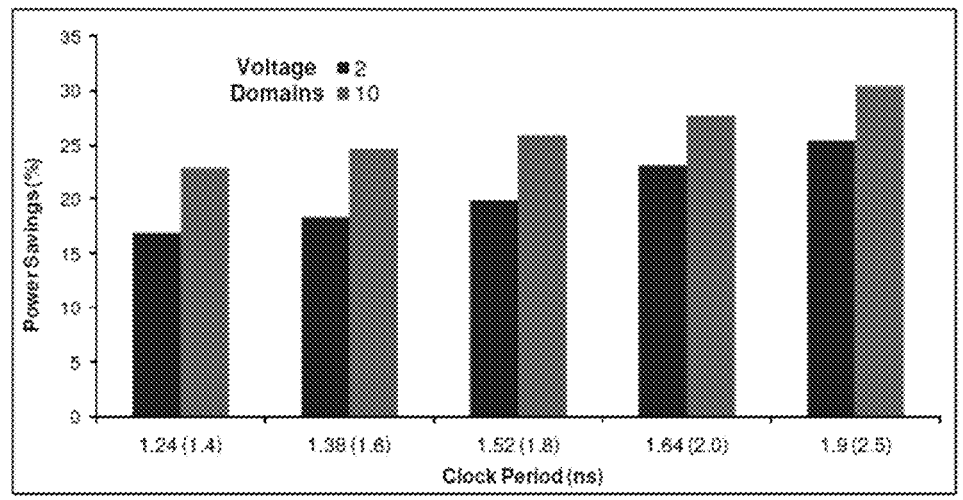
FIG. 17 shows a bar graph indicating power savings of post-silicon test-phase power balancing performed in an example embodiment using a baseline of a power-optimized pipeline and cycle stealing to maximize performance (frequency). The numbers in parentheses are the corresponding clock periods for the power-optimized baseline.

FIG. 17 shows the corresponding results for the cycle stealing-based performance maximized baseline. In particular, FIG. 17 shows a bar graph indicating power savings of post-silicon test-phase power balancing performed in an example embodiment using a baseline of a power-optimized pipeline and cycle stealing to maximize performance (frequency). The numbers in parentheses are the corresponding clock periods for the power-optimized baseline.

The benefits from power balancing are higher in spite of tighter microarchitectural loops due to significantly increased power consumption of the performance-maximized baseline.

Figure 18:
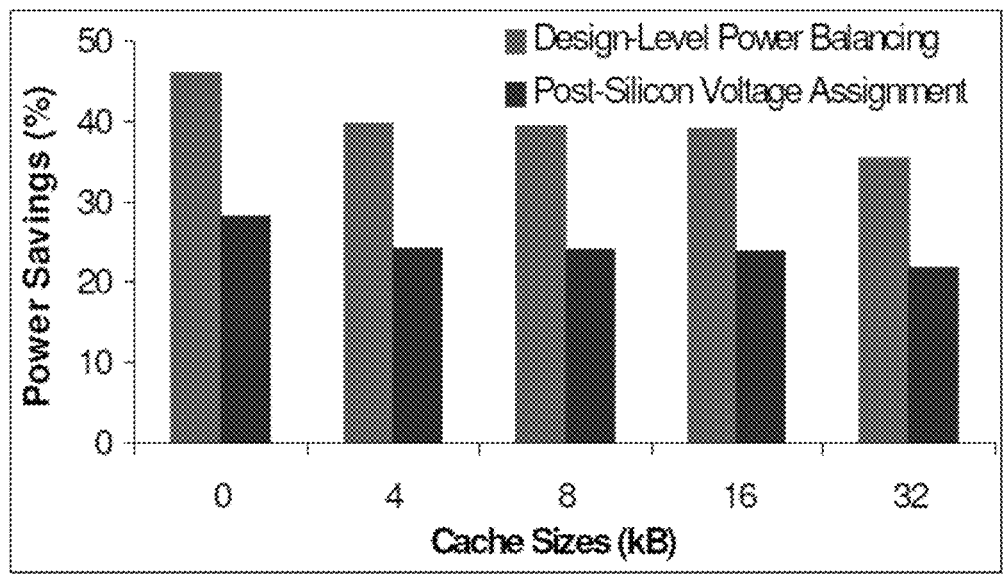
FIG. 18 shows a bar graph indicating power savings that account for the power consumed by SRAMs and core logic for different cache sizes.
Figure 19B:
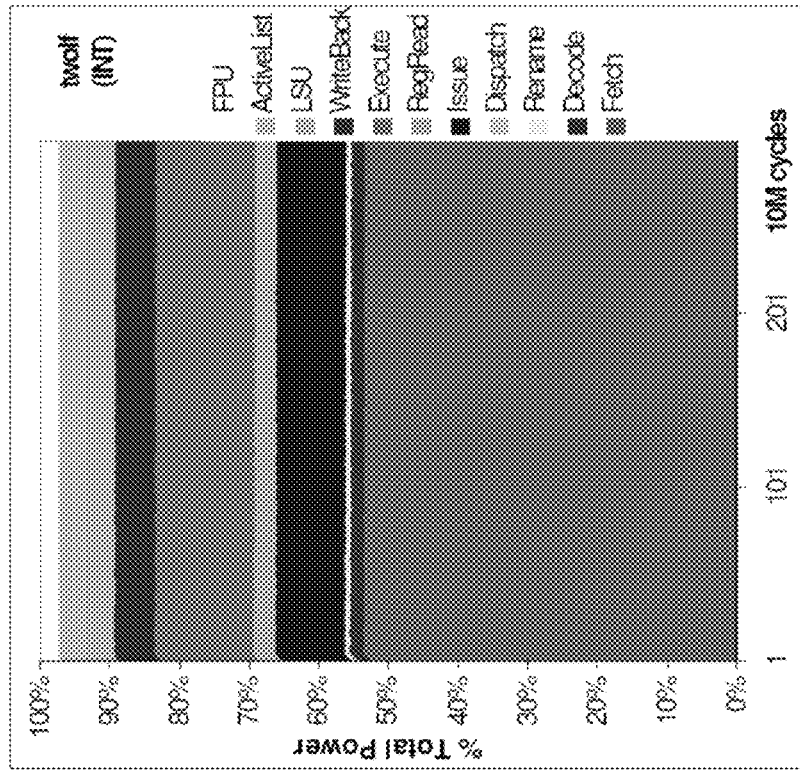
FIGS. 19A-19D show power consumption for pipeline stages when executing INT benchmarks.
Figure 19A:
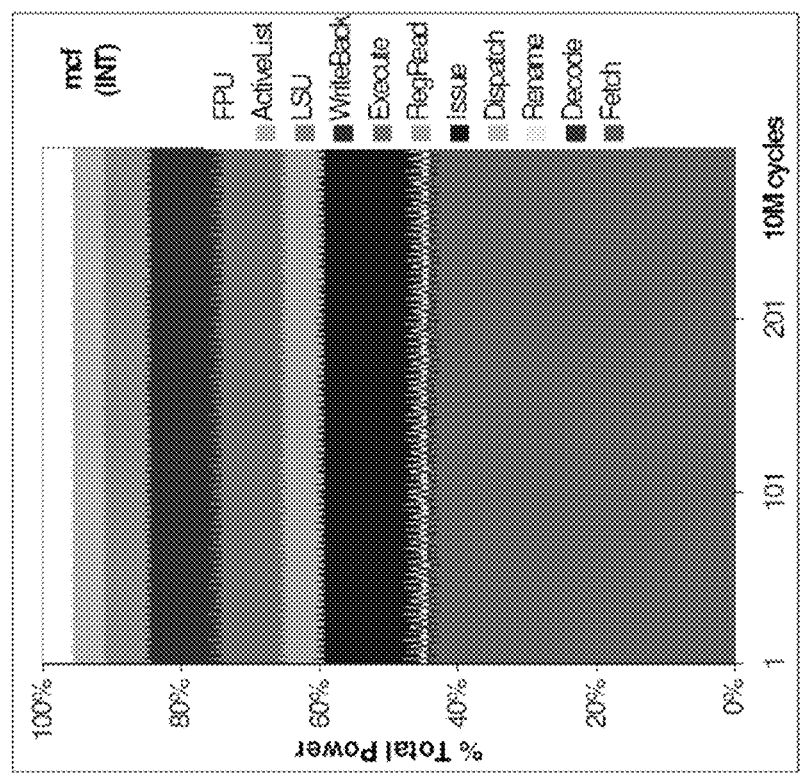
Figures 19C, 19D:
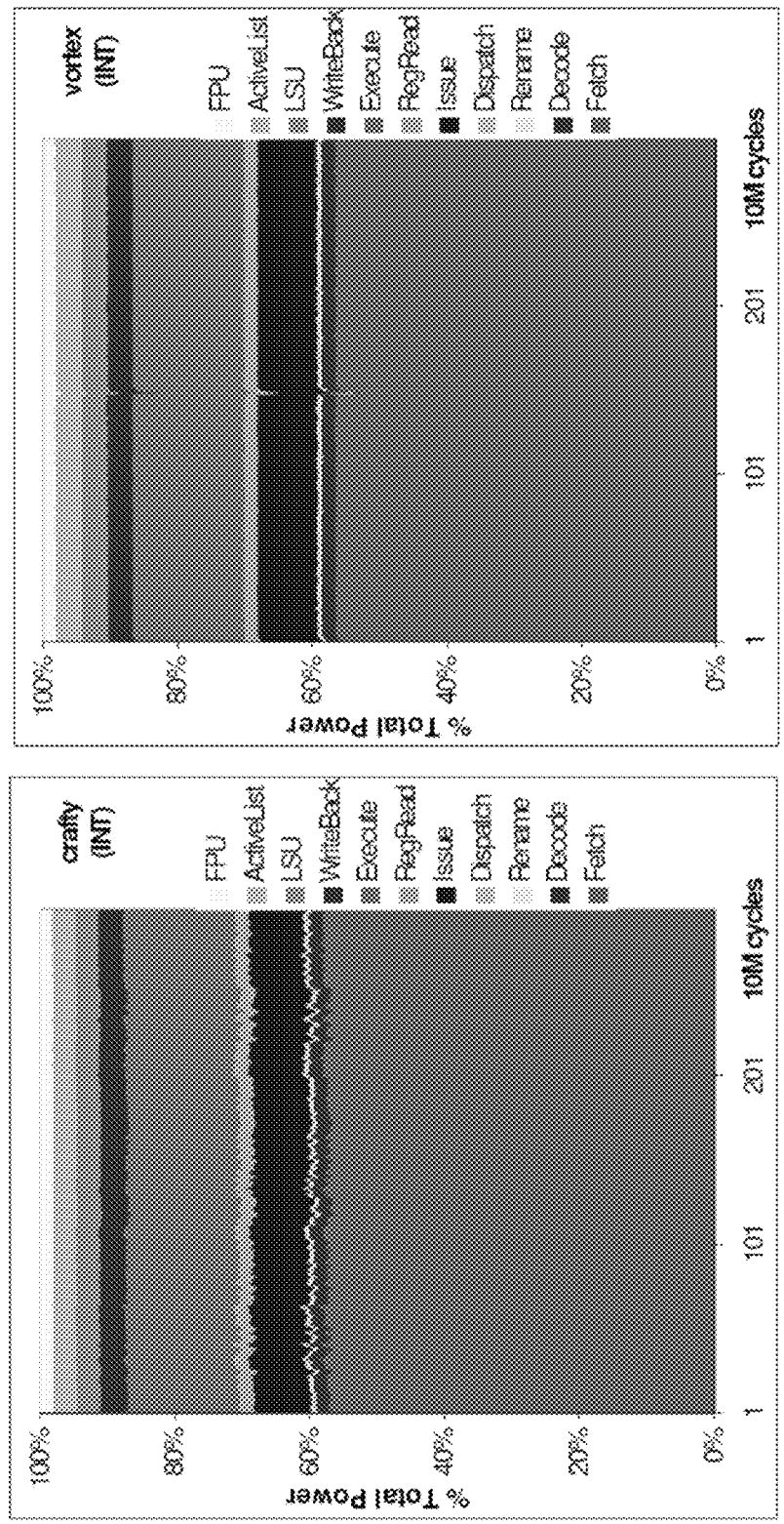

FIG. 18 shows a bar graph indicating power savings that account for the power consumed by SRAMs and core logic for different cache sizes. The SRAM is generally used as part of the internal cache memory of the computer system. The memory built into the processor core is often sub-divided into instruction cache (I-cache) and data cache (D-cache). These two caches are generally of equal size. Therefore, the x-axis values on the bar graph indicates the size in kB of I-cache and D-cache (e.g., x=4 means I-cache=D-cache=4 kB). Referring to FIG. 16, processor-wide power savings, averaged over the benchmarks, are shown for different I-cache and D-cache sizes at maximum operating frequency (T=1.4 ns). The data for cache size 0 represents power savings for core logic alone.

Example—Dynamic Power Balancing

FIGS. 19A-19D show power consumption for pipeline stages when executing sample integer (INT) benchmarks, demonstrating that the power breakdown remains fairly stable. This can be attributed to the situation where stages in a pipeline operate synchronously. In such a case, when the utilization of one stage changes, then the utilization of other stages tend to follow suit. An analogy for the synchronized pipeline can be the water hose—if the end of the hose is pinched, the flow through the hose is slowed down in the entire hose. Since all the stages in a pipeline (without FP) can operate synchronously, when the utilization of one stage changes, the utilization of all other stages tends to follow suit. Thus, the fraction of power consumed by each stage does not vary significantly, and static power balancing performs well in most scenarios.

Although absolute power consumption can vary between benchmarks, power balancing can be focused on the relative power breakdown between stages, resulting in the observation of no significant difference in the optimization strategy or benefits for different benchmarks during the evaluation of power balancing for a FabScalar pipeline, which does not support a FPU. Thus, the fraction of total power consumed by each stage in FabScalar does not vary significantly or dynamically, and static design-level power balancing is sufficient. For processor pipelines that perform synchronously, the power balancing can be implemented completely at design time, resulting in no need to include the overhead of dynamic voltage scaling or tunable delay circuits.

However, in cases where there are dynamic changes in the relative power breakdown between stages, then the processor can benefit from dynamic power balancing.

For example, in a processor that contains a FPU, dynamic power balancing can be a useful technique. In particular, dynamic power balancing can be applied to stages of processors in which the fraction of power consumed by the stage varies dynamically. According to an embodiment, this can be defined as a stage that consumes a significant fraction of total processor power and is utilized with significant variety (and somewhat independently) from the rest of the pipeline.

Dynamic power balancing is useful for FPU because FPUs can consume a significant fraction of total processor power, and FP benchmarks typically contain intermittent phases of intense FPU utilization that integer benchmarks do not.

Figure 20A:
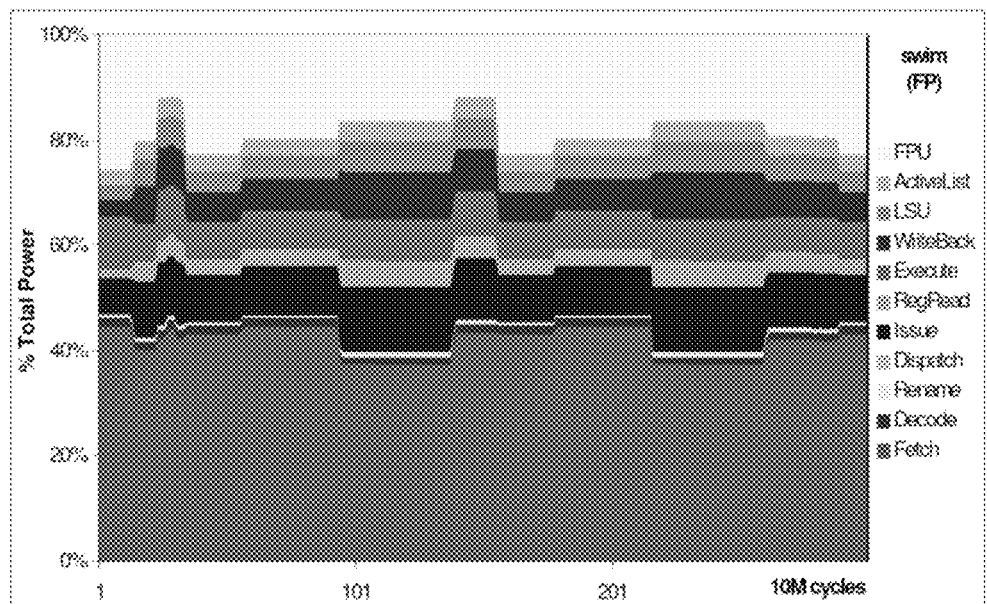
FIGS. 20A and 20B show that dynamic changes in the power breakdown of a processor while running a FP benchmark do not deviate significantly from the average. Results are shown for the FP benchmarks that exhibit the most dynamic variation.
Figure 20B:
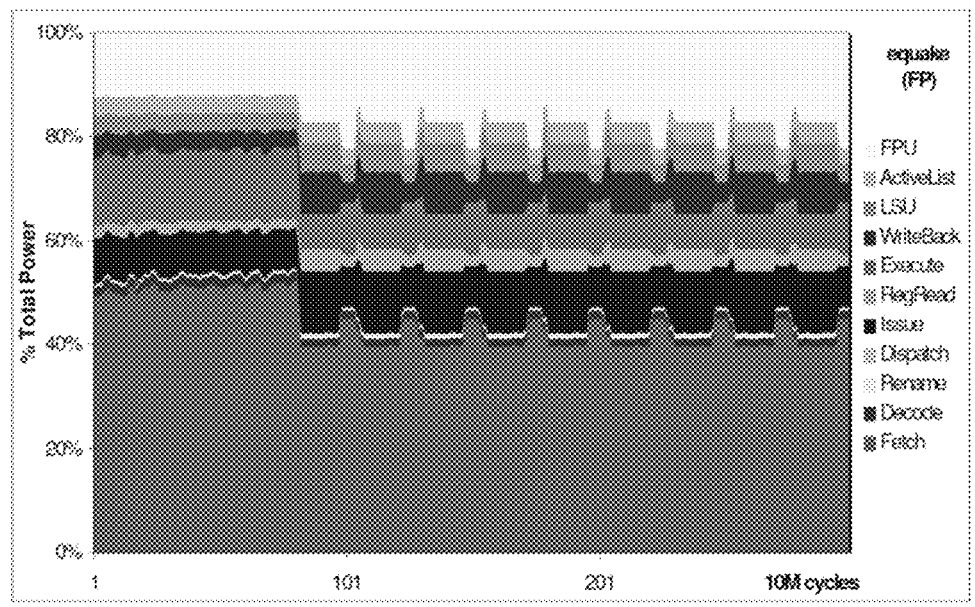

FIGS. 20A and 20B show power consumption for pipeline stages when running a floating point (FP) benchmark. Dynamic changes in the power breakdown of a processor while running a FP benchmark do not deviate significantly from the average. Results are shown for the FP benchmarks that exhibit the most dynamic variation.

The activity factor of the FPU was characterized over time for different benchmarks using smtsim. SPR was then performed for the FPU from the OpenSPARC T1 processor, an open source project originating from Sun Microsystems, to allow accurate design-level power and delay characterization. To characterize FPU power vs. time for different benchmarks, the activity profiles captured from smtsim on the OpenSPARC FPU were propagated using the SYNOPSYS PRIMETIME platform.

Figure 21:
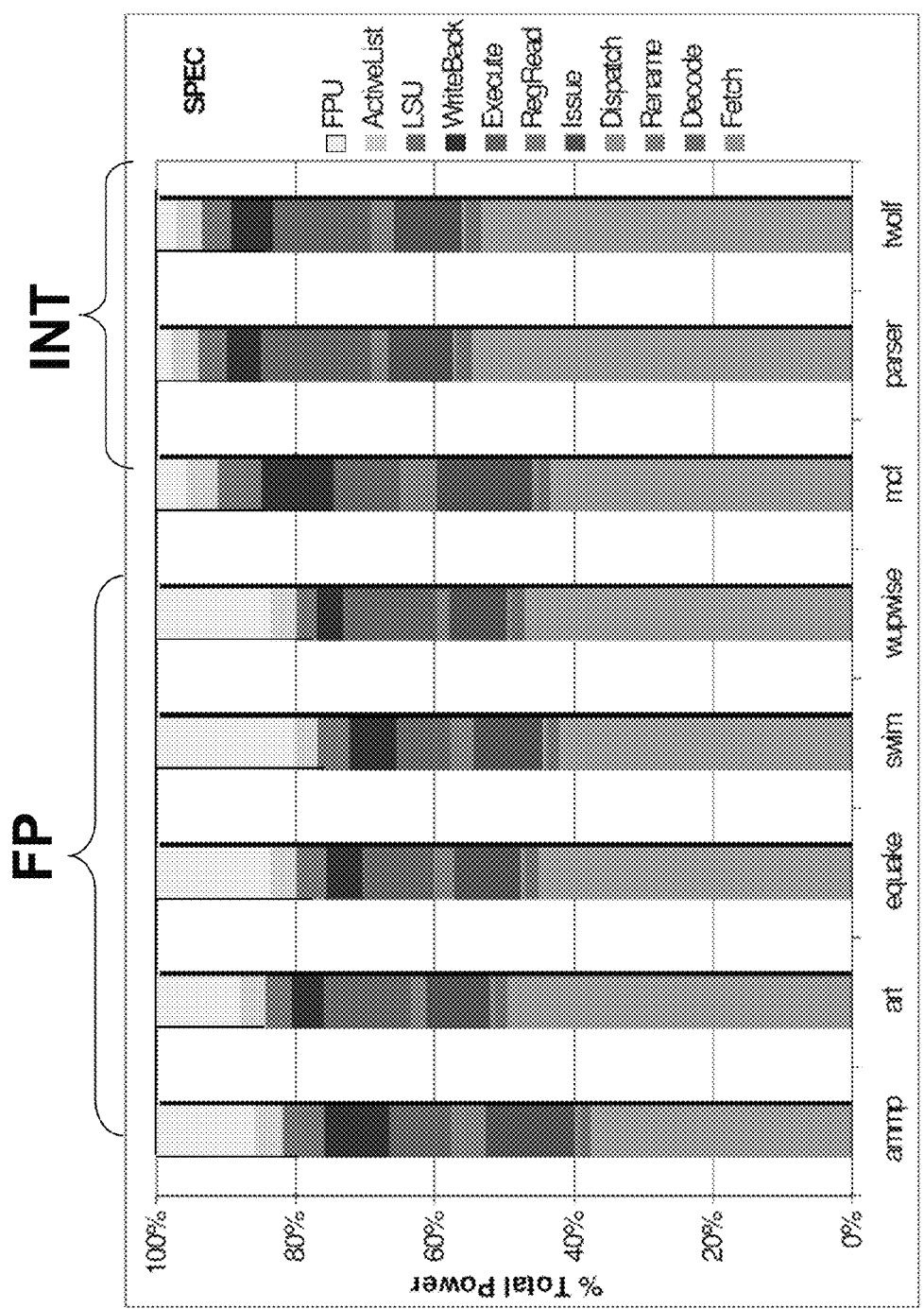
FIG. 21 provides a comparison of power consumption according to pipeline stages illustrating the differences for INT benchmarks and FP benchmarks.
Figure 22:
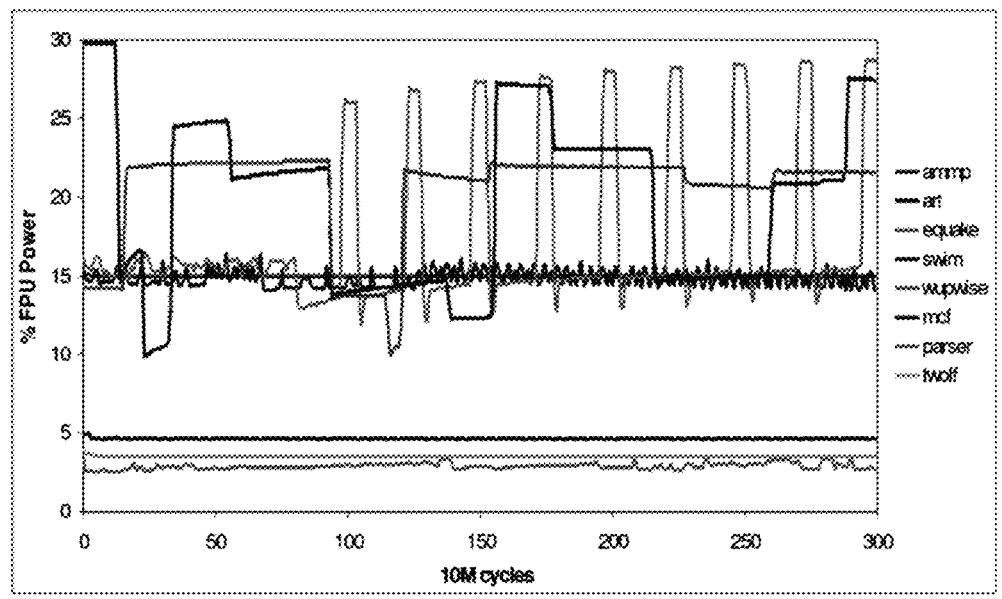
FIG. 22 provides a comparison of power consumption of pipeline stages across different configurations, showing how the fraction of processor power consumed by the FPU is significantly different for INT benchmarks and FP benchmarks.

FIG. 21 shows the average pipeline power breakdown. FP benchmarks for ammp, art, equake, swim, and wupwise are shown, while only three of the INT benchmarks (mcf, parser, and twolf) are shown. FIG. 22 shows the percentage of total processor power consumed in the FPU over the execution of several benchmarks.

As illustrated in FIGS. 21 and 22, the difference in the pipeline power breakdown between INT and FP benchmarks can be significant due to the change in FPU power consumption. The fraction of total power consumed by a FPU may vary dynamically because a FPU can consume a significant fraction of total processor power, and FP benchmarks typically contain intermittent phases of intense FPU utilization that integer benchmarks do not. Thus, dynamic power balancing may achieve benefits by identifying and adapting to FP and non-FP workloads.

FIGS. 21 and 22 confirm that the pipeline power breakdown does not vary significantly within or between INT benchmarks, even for a processor with a FPU. Also, the fraction of power consumed by the FPU for INT benchmarks is small, resulting in minimal benefit from dynamic power balancing within INT benchmarks. The figures also show that the difference in the pipeline power breakdown between INT and FP benchmarks can be significant due to the change in FPU power consumption. Significant variations were observed in FPU power within FP benchmarks (FIG. 22). However, the benefits of adaptation within a FP benchmark may be limited, as these variations do not significantly affect the pipeline power breakdown (FIGS. 20A and 20B).

Figure 23:
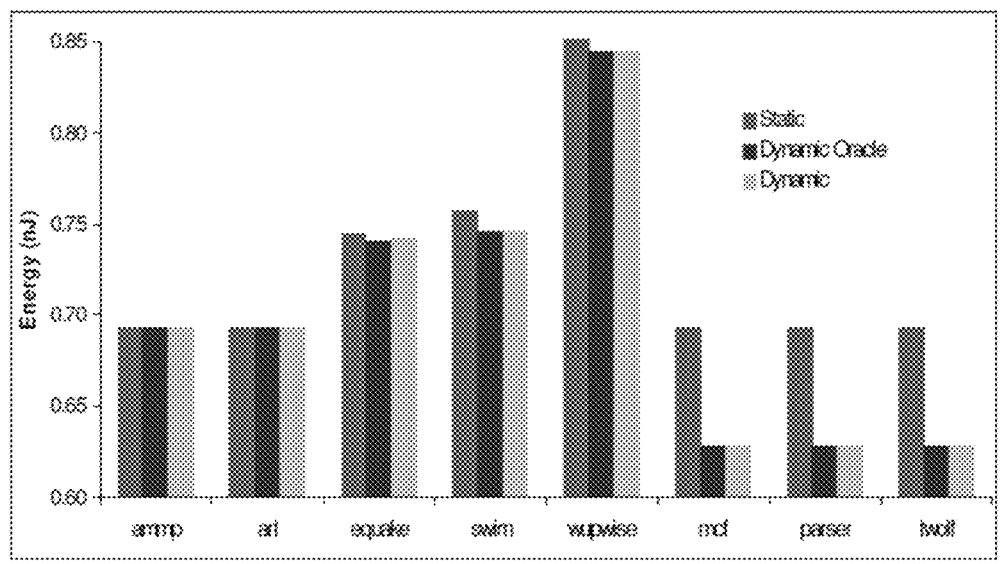
FIG. 23 shows a bar graph of energy savings of static and dynamic power balancing.

FIG. 23 evaluates dynamic power balancing by comparing the energy required to execute several benchmarks for three scenarios. In the static case, the power balancing strategy is the same for all benchmarks, based on the average power consumption of each stage, including the FPU. In the two dynamic cases, the power balancing strategy is adapted as the FPU utilization changes. The dynamic oracle represents an ideal policy where the processor always uses the optimal power balancing strategy for a given program phase (i.e. workload). The dynamic case represents a realistic implementation that includes overheads of dynamic adaptation required to recognize and adapt to the program phase dynamically.

The most substantial difference between static and dynamic is for INT benchmarks. Since static is optimized for average case FPU activity, INT benchmarks—which have almost no FPU activity—exhibit 10% higher energy, on average. For FP benchmarks, the difference between optimizing for average FPU activity (static) and full dynamic adaptation is small (1-2%), since variation in FPU activity does not cause the relative power breakdown to deviate significantly from the average. Therefore, the potential benefit of dynamic adaptation is mainly in adapting to the differences between INT and FP benchmarks, but not the differences between phases within a FP benchmark. This is somewhat beneficial, because it allows for a very simple adaptation technique as utilized in certain embodiments of the invention. The technique only needs to recognize the difference between FP and non-FP phases and adapt the power balancing strategy accordingly. This mainly involves shifting power between the FPU and the stages of one architectural loop. Thus, the overhead for adaptation circuitry (tunable delay buffers and voltage scaling) can be confined to this loop of the processor.

The time required to adapt stage voltages to new levels (at 10 mV/μs) when power is re-balanced can successfully be handled with minimal overhead by being performed within the timeframe allocated to context switch overhead that occurs every OS timeslice. The dynamic adaptation of voltage and cycle time are particularly useful for loops containing the FPU. Thus, hardware overhead for dynamic adaptation mechanisms can be kept relatively low.

The dynamic power balancing results in this section assumes the availability of per-stage voltage adaptation. Nevertheless, energy increases by less than 5% if only two voltage domains are allowed.

Example: Voltage Scaling

Voltage scaling can be illustrated with an example in which a simple, low-power stage ($S_{lo}$, with power $P_{lo}$) donates a fraction of its cycle time to a complex, high-power stage ($S_{hi}$, with power $P_{hi}$). As a result of this exchange, the voltage of $S_{hi}(V_{hi})$ can be decreased by $\Delta V_{hi}$, and the voltage of $S_{lo}(V_{lo})$ is increased by $\Delta V_{lo}$.

In order for this trade to reduce power, the net change in power for the pipeline is less than zero, i.e., $\Delta P_{hi} + \Delta P_{lo} < 0$. Thus, voltage scaling is another way to adjust net power. Equation 2 describes the change in total stage power ($\Delta P_{total} = \Delta P_{leak} + \Delta P_{dyn}$) that results from voltage scaling.

$$P + \Delta P = \left(\frac{V + \Delta V}{V}\right)^n P \Rightarrow \Delta P = P\left(\left(\frac{V + \Delta V}{V}\right)^n - 1\right) \quad (1)$$

$$\Delta P_{leak} = \Delta P(n=1) = P_{leak}\left(\frac{\Delta V}{V}\right)$$

$$\Delta P_{dyn} = \Delta P(n=2) = P_{dyn}\left(\frac{\Delta V}{V}\right)\left(2 + \frac{\Delta V}{V}\right) \quad (2)$$

$$\Delta P_{total} = \Delta P_{leak} + \Delta P_{dyn} = \left(\frac{\Delta V}{V}\right)\left(P_{leak} + P_{dyn}\left(2 + \frac{\Delta V}{V}\right)\right)$$

The expanded expression for $\Delta P$ can be substituted into the inequality describing a trade that reduces total power to obtain Equation 3. For simplicity, it can be assumed that the initial voltages are equal for each stage ($V_{hi} = V_{lo} = V$), as would be the initial condition for the pipeline.

$$\Delta P_{hi} + \Delta P_{lo} < 0 \Rightarrow \left|\frac{\Delta V_{hi}}{\Delta V_{lo}}\right| > \frac{P_{lo,leak} + P_{lo,dyn}\left(2 + \frac{\Delta V_{lo}}{V}\right)}{P_{hi,leak} + P_{hi,dyn}\left(2 + \frac{\Delta V_{hi}}{V}\right)} \quad (3)$$

Assuming that $|\Delta V_{hi}| \approx |\Delta V_{lo}|$ (a reasonable assumption if voltage remains in the "linear" region of the delay vs. voltage curve such as shown in FIG. 8), the condition for a power-saving trade becomes even simpler (Equation 4).

$$P_{hi,leak} + P_{hi,dyn}\left(2 + \frac{\Delta V}{V}\right) > P_{lo,leak} + P_{lo,dyn}\left(2 + \frac{\Delta V}{V}\right) \quad (4)$$

$$P_{hi,total} + \kappa \cdot P_{hi,dyn} > P_{lo,total} + \kappa \cdot P_{lo,dyn}$$

$$(\kappa = 1 + \Delta V/V)$$

The simplified condition for a power-saving trade illustrates how power balancing typically results in processor power savings for the same performance when the power of the time stealing pipeline stage is greater than the power of the time donating stage. The greater the power differential between the two pipeline stages, the more power is reduced when cycle time is redistributed from the low-power stage to the high-power stage.

The methods and processes described herein can be embodied as code and/or data. The software code and data described herein can be stored on one or more computer-readable media, which may include be any device or medium that can store code and/or data for use by a computer system. When a computer system reads and executes the code and/or data stored on a computer-readable medium, the computer system performs the methods and processes embodied as data structures and code stored within the computer-readable medium.

In accordance with embodiments of the invention, computer-readable media can be any available computer-readable storage media or communication media that can be accessed by a computer system.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" should not be construed or interpreted to include any carrier waves or propagating signals.

In addition, certain methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

We claim:

1. A computer-implemented method comprising:
    performing a power balancing between stages of a microarchitectural pipeline, the power balancing reducing between the e stages of the microarchitectural pipeline to achieve an equal power consumption for all the stages while perm unbalancing of delays of the stages.

2. The method of claim 1, wherein the power balancing between the stages of the microarchitectural pipeline is performed after the stages have undergone delay balancing.

3. The method of claim 1, wherein the power balancing between the stages of the microarchitectural pipeline is performed during synthesis of pipeline clocks.

4. The method of claim 1, wherein performing the power balancing between the stages of the microarchitectural pipeline comprises:
    determining a range of timing and voltage constraints for each stage in a register transfer level (RTL) code that provides a minimum power consumption while achieving a desired operating frequency and using available voltage domains; and
    performing a cycle time stealing between the stages according to a heuristic for minimizing overall power consumption using the determined range of timing and voltage constraints for each stage.

5. The method of claim 4, wherein performing the cycle time stealing provides an optimized configuration, the method further comprising:
    calculating adjustment values for tunable delay buffers and/or dynamic voltage scaling using test measurements and the optimized configuration.

6. A computer-implemented method comprising:
    performing a power balancing between stages of a microarchitectural pipeline, wherein performing the power balancing between the stages of the microarchitectural pipeline comprises:
        determining a range of timing and voltage constraints for each stage in a register transfer level (RTL) code that provides a minimum power consumption while achieving a desired operating frequency and using available voltage domains, wherein determining the range of timing and voltage constraints for each stage comprises: calculating power consumption for each stage over a range of timing constraints and each voltage domain; and
        performing a cycle time stealing between the stages according to a heuristic for minimizing overall power consumption using the determined range of timing and voltage constraints for each stage.

7. The method of claim 6, wherein performing the cycle time stealing between the stages according to the heuristic for minimizing overall power consumption using the determined range of timing and voltage constraints for each stage comprises:
    performing an exhaustive search of implementation paths with a minimum power consumption and an available slack within a pipeline loop.

8. A computer-implemented method comprising:
    performing a power balancing between stages of a microarchitectural pipeline, wherein performing the power balancing between the stages of the microarchitectural pipeline comprises:
        determining a range of timing and voltage constraints for each stage in a register transfer level (RTL) code that provides a minimum power consumption while achieving a desired operating frequency and using available voltage domains; and
        performing a cycle time stealing between the stages according to a heuristic for minimizing overall power consumption using the determined range of timing and voltage constraints for each stage, wherein performing the cycle time stealing between the stages according to the heuristic for minimizing overall power consumption using the determined range of timing and voltage constraints for each stage comprises:
            checking that voltage between adjacent stages is less than a threshold voltage (Vt) of transistors making up the stages.

9. A computer-implemented method comprising:
    performing a power balancing between stages of a microarchitectural pipeline, wherein performing the power balancing between the stages of the microarchitectural pipeline comprises:

determining a range of timing and voltage constraints for each stage in a register transfer level (RTL) code that provides a minimum power consumption while achieving a desired operating frequency voltage domains; and performing a cycle time stealing between the stages according to a heuristic for minimizing overall power consumption using the determined range of timing and voltage constraints for each stage, wherein performing the cycle time stealing between the stages according to the heuristic for minimizing overall power consumption using the determined range of timing and voltage constraints for each stage comprises:

selecting a stage from a microarchitectural pipeline design;

checking loops to which the stage belongs; and for a loop to which the stage belongs, applying the cycle time stealing such that only stages in a same loop exchange delay and any other loops to which the stage belongs are balanced.

10. A computer-implemented method comprising:

performing a power balancing between stages of a microarchitectual pipeline, wherein performing the power balancing between the stages of the microarchitectural pipeline comprises:

determining a relative power breakdown during runtime of a processor using one or more performance indicators; and using the relative power breakdown to assign timing and voltage values to the stages of the microarchitectural pipeline.

11. The method of claim 10, wherein using the relative power breakdown to assign the timing and voltage values to the stages of the microarchitectural pipeline comprises:

using an output from the one or more performance indicators to map to select bits that select a certain look-up table entry comprising values of a corresponding power balance cycle stealing configuration for assigning to the stages of the microarchitectural pipeline.

12. The method of claim 10, wherein determining the relative power breakdown during run-time of the processor and using the relative power breakdown to assign the timing and voltage values to the stages of the microarchitectural pipeline comprises:

counting a number of floating point instructions executed during an operating system timeslice;

comparing the number of floating point instructions to a threshold value; and using a comparison result of the comparing to select a voltage map to assign the values to the stages of the microarchitectural pipeline including a floating point unit stage.

13. A computer-readable storage medium having instructions stored thereon that when executed perform a method comprising:

performing a power balancing between stages of a microarchitectural pipeline, wherein performing the power balancing between the stages of the microarchitectural pipeline comprises:

determining a range of timing and voltage constraints for each stage in a register transfer level (RTL) code that provides a minimum power consumption while achieving a desired operating frequency and using available voltage domains, wherein determining the range of timing and voltage constraints for each stage comprises:

calculating power consumption for each stage over a range of timing constraints and each voltage domain; and performing a cycle time stealing between the stages according to a heuristic for minimizing overall power consumption using the determined range of timing and voltage constraints for each stage.

14. The medium of claim 13, wherein the power balancing between the stages of the microarchitectural pipeline is performed after the stages have undergone delay balancing.

15. The medium of claim 13, wherein the power balancing between the stages of the microarchitectural pipeline is performed during synthesis of pipeline clocks.

16. The medium of claim 13, wherein performing the cycle time stealing between the stages according to the heuristic for minimizing overall power consumption using the determined range of timing and voltage constraints for each stage comprises:

performing an exhaustive search of implementation paths with minimum power consumption and an available slack within a pipeline loop.

17. The medium of claim 13, wherein performing the cycle time stealing between the stages according to the heuristic for minimizing overall power consumption using the determined range of timing and voltage constraints for each stage comprises:

checking that voltage between adjacent stages is less than a threshold voltage (Vt) of transistors making up the stages.

18. The medium of claim 13, wherein performing the cycle time stealing between the stages according to the heuristic for minimizing overall power consumption using the determined range of timing and voltage constraints for each stage comprises:

selecting a stage from a microarchitectural pipeline design;

checking loops to which the stage belongs; and for a loop to which the stage belongs, applying the cycle time stealing such that only stages in a same loop exchange delay and any other loops to which the stage belongs are balanced.

19. A computer-readable storage medium having instructions stored thereon that when executed perform a method comprising:

performing a power balancing between stages of a microarchitectural pipeline, wherein performing the power balancing between the stages of the microarchitectural pipeline comprises:

determining a relative power breakdown during run-time of a processor using one or more performance indicators; and using the relative power breakdown to assign timing and voltage values to the stages of the microarchitectural pipeline.

20. The medium of claim 19, wherein using the relative power breakdown to assign the timing and voltage values to the stages of the microarchitectural pipeline comprises:

using an output from the one or more performance indicators to map to select bits that select a certain look-up table entry comprising values of a corresponding power balance cycle stealing configuration for assigning to the stages of the microarchitectural pipeline.

21. The medium of claim 19, wherein determining the relative power breakdown during run-time of the processor and using the relative power breakdown to assign timing and voltage values to the stages of the microarchitectural pipeline comprises:

counting a number of floating point instructions executed during an operating system timeslice;
comparing the number of floating point instructions to a threshold value; and
using a comparison result of the comparing to select a voltage map to assign values to the stages of the microarchitectural pipeline including a floating point unit stage.

* * * * *

UNITED STATES PATENT AND TRADEMARK OFFICE
CERTIFICATE OF CORRECTION

PATENT NO. : 8,806,410 B2
APPLICATION NO. : 13/662929
DATED : August 12, 2014
INVENTOR(S) : Rakesh Kumar, Benjamin J. Ahrens and John M. Sartori It is certified that error appears in the above-identified patent and that said Letters Patent is hereby corrected as shown below:

In the Claims

Column 23, Claim 1,
Lines 53-54, "the power balancing reducing between the e stages of the microarchitectural pipeline" should read
--the power balancing reducing a power imbalance between the stages of the microarchitectural pipeline--.

Claim 1, Lines 55-56, "to achieve an equal power consumption for all the stages while perm unbalancing of delays of the stages." should read
--to achieve an equal power consumption for all the stages while permitting an unbalancing of delays of the stages.--.

Column 24, Claim 4,
Lines 3-5, "that provides a minimum power consumption while achieving a desired operating frequency voltage domains; and" should read
--that provides a minimum power consumption while achieving a desired operating frequency and using available voltage domains; and--.

Signed and Sealed this
Seventeenth Day of March, 2015

Michelle K. Lee
*Director of the United States Patent and Trademark Office*